United States Patent [19]

Maehara

[11] Patent Number: 5,410,466
[45] Date of Patent: Apr. 25, 1995

[54] HIGH POWER-FACTOR INVERTER DEVICE HAVING REDUCED OUTPUT RIPPLE

[75] Inventor: Minoru Maehara, Kadoma, Japan

[73] Assignee: Matsushita Electric Works, Ltd., Osaka, Japan

[21] Appl. No.: 112,207

[22] Filed: Aug. 26, 1993

[30] Foreign Application Priority Data

Aug. 26, 1992 [JP] Japan .................................. 4-226604
Aug. 26, 1992 [JP] Japan .................................. 4-226605

[51] Int. Cl.[6] ............................................ H02M 7/44
[52] U.S. Cl. ...................................... 363/98; 363/17; 363/40; 363/44; 363/132; 363/134; 315/224; 315/242
[58] Field of Search ................. 363/37, 40, 41, 45, 363/46, 47, 48, 17, 98, 132, 134; 315/224, 242

[56] References Cited

U.S. PATENT DOCUMENTS

| 4,511,823 | 4/1985 | Eaton et al. ................ 315/224 X |
| 5,063,491 | 11/1991 | Maehara et al. ................. 363/37 |
| 5,134,344 | 7/1992 | Vos et al. .................. 315/224 X |

Primary Examiner—A. D. Pellinen
Assistant Examiner—Y. J. Han

[57] ABSTRACT

An inverter device includes an input power-factor improving circuit which causes part of a high frequency output of an inverter circuit to feedback, through an impedance element forming at least part of two oscillatory systems, to a rectified output end of a rectifier, and a high-frequency current supply to the rectifier to be made substantially over entire range of an AC source voltage, and a control means operates the inverter circuit at a fixed frequency for attaining the two oscillatory systems in which the output supplied to a load is substantially equalized, whereby ripple component giving ill influence on the load can be remarkably reduced.

10 Claims, 32 Drawing Sheets

HIGH POWER-FACTOR INVERTER DEVICE HAVING REDUCED OUTPUT RIPPLE

BACKGROUND OF THE INVENTION

This invention relates to an inverter device in which part of a high frequency output of an inverter circuit is caused to feedback to a rectifier, and a high-frequency current supply to the rectifier is made possible substantially over the entire range of an AC source voltage, so as to improve the input power-factor.

DESCRIPTION OF RELATED ART

For known inverter devices suggested for improving the input power-factor and the efficiency, there has been shown in, for example, Japanese Patent Laid-Open Publication No. 4-193067 by M. Maehara an inverter device which has been used as a discharge lamp lighting device. More specifically, this discharge lamp lighting device comprises a diode bridge acting as a rectifier for an AC source voltage, a smoothing capacitor for smoothing an output of the diode bridge, an inverter circuit including a vibration system and converting a voltage across the smoothing capacitor into a high frequency voltage as an output, and an input power-factor improving circuit which causes part of the high frequency output of the inverter circuit to feedback through at least a further capacitor as an impedance element to a DC output end of the diode bridge and carries out a high-frequency current supply to the diode bridge substantially over the entire range of the AC source voltage.

In the inverter circuit of this inverter device, a pair of switching elements are connected in series to both ends of the smoothing capacitor, a discharge lamp is connected across one of the pair of switching elements with a DC-component cutting capacitor and an inductor interposed, and a preheating capacitor for filaments of the discharge lamp is connected across non-source side ends of the filaments. In this case, the preheating capacitor constitutes along with the inductor the oscillatory system contained in the inverter circuit.

In the above inverter circuit, the voltage across the smoothing capacitor is converted into the high frequency voltage by means of alternate high-frequency turning ON and OFF of the pair of switching elements, for the purpose of a high-frequency lighting of the discharge lamp. That is, the discharge lamp is subjected to such high-frequency lighting that, when first one of the pair of switching elements is turned ON, the high frequency voltage is supplied to the discharge lamp through the smoothing capacitor, the first switching element, the inductor and the DC-component cutting capacitor, and, when second one of the switching elements is turned ON with a charge accumulated as a power source in the DC-component cutting capacitor during the above voltage supply, the power is supplied to the discharge lamp in reverse direction to that upon the turning ON of the first switching element through the DC-component cutting capacitor, the inductor and the second switching element.

In the input power-factor improving circuit of the foregoing discharge lamp lighting device, the circuit comprises the capacitor as the impedance element connected between a juncture of the DC-component cutting capacitor to the discharge lamp and a positive pole side output end of the diode bridge, and a diode connected between the positive pole side output end of the diode bridge and the smoothing capacitor. In the discharge lamp device including this input power-factor improving circuit, at the time of the turning ON of the second one of the pair of the switching elements, a current is caused to flow through a path of the diode bridge, capacitor as the impedance element, DC-component cutting capacitor, inductor and second switching element, and further an inverted current is caused to flow, due to an action of the oscillatory system comprising the capacitor as the impedance element and inductor during ON state of the first one of the pair of the switching elements, mainly through a path of the capacitor as the impedance element, power-factor improving diode, first one of the pair of switching elements, inductor and DC-component cutting capacitor.

Thus the input power-factor can be improved by means of the high-frequency supply of current through the impedance-use capacitor to the diode bridge over the entire range of the AC source voltage, and, accordingly, the input power-factor improvement can be executed by such simple measure of adding the impedance-use capacitor and diode.

In the foregoing known inverter device employed as the discharge lamp lighting device, however, there arises such problem that a ripple component is caused to become remarkable upon oscillation in the switching frequency of the pair of switching elements, giving an ill influence on the operation of such load as the discharge lamp, in which event a flicker or the like is likely to occur in light output of the discharge lamp.

SUMMARY OF THE INVENTION

Accordingly, an object of the present invention is to provide an inverter device which is capable of overcoming the foregoing problem in the known art and, in particular, remarkably reducing the ripple component which exerts ill influence upon the load of the device the input power-factor of which is attempted to be improved by causing part of high frequency output to feedback to the rectifier for an AC source voltage and attaining the high-frequency current supply to the rectifier substantially over the entire range of the AC source voltage.

According to the present invention, the above object can be realized by an inverter device in which an AC source voltage is rectified by a rectifier, a rectified output of which is smoothed through a smoothing capacitor, a voltage across the smoothing capacitor is converted into a high frequency voltage by an inverter circuit including a first oscillatory system, an input power-factor improving circuit causes part of a high frequency output of the inverter circuit to feedback through an impedance element to a rectified output end of the rectifier and a high-frequency current supply to the rectifier to be effected substantially over the entire range of the AC source voltage, and the impedance element in the inverter circuit and connected to the rectified output end of the rectifier constitutes at least part of the first oscillatory system as well as a second oscillatory system, wherein the inverter circuit is operated by a control means in the first and second oscillatory systems with a fixed frequency which renders supplied output to a load substantially constantly equal.

Other objects and advantages of the present invention shall be made apparent in following description of the invention detailed with reference to preferred embodiments shown in accompanying drawings.

It should be appreciated here that, while the invention should be described with reference to the embodiments shown in the accompanying drawings, the intention is not to limit the invention only to these embodiments but is to rather include all alterations, modification and equivalent arrangements possible within the scope of appended claims.

DETAILED DESCRIPTION OF THE PREFERRED EMBODIMENTS

Figure 1:
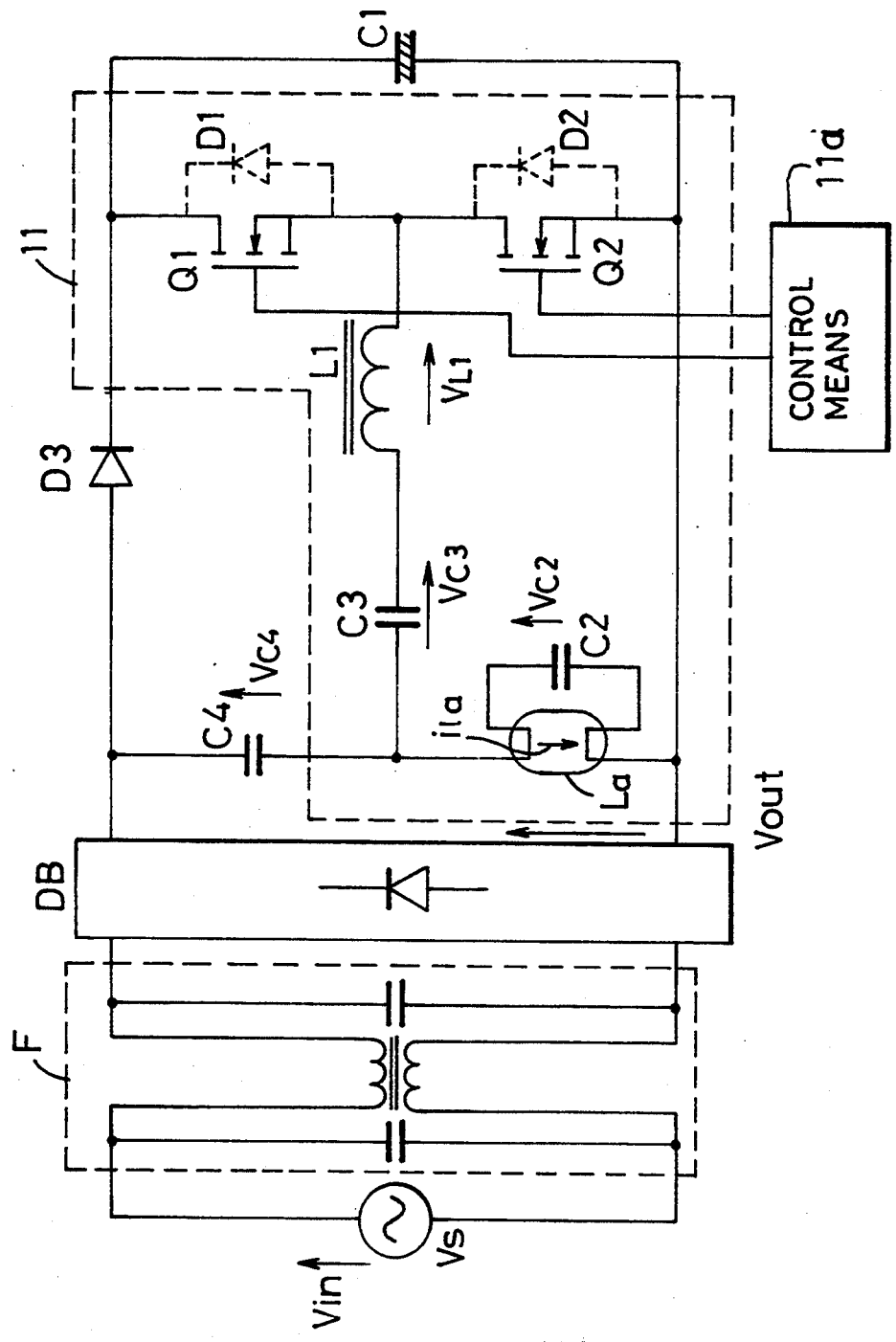
FIG. 1 shows in a circuit diagram an embodiment of the inverter device according to the present invention.

Referring here to FIG. 1, there is shown in a circuit diagram an embodiment of the inverter device according to the present invention, and references shall be first made to an occurrence of ripple component to be reduced according to the present invention, for promotion of better understanding of the present invention. The device comprises an inverter circuit 11, and a capacitor C4 connected thereto as an impedance element is to be charged in a direction denoted by an arrow in FIG. 1 when a current flows from a diode bridge DB through a path of the capacitor C4, DC component cutting capacitor C3, inductor L1 and second one Q2 of a pair of switching elements Q1 and Q2, in similar manner to the foregoing known device. On the other hand, the capacitor C4 carries out a discharge in a path of a current flow mainly through the capacitor C4, diode D3, first one Q1 of the pair of switching elements, inductor L1 and capacitor C3, upon which a voltage across the capacitor C4 is caused to be lowered.

Figure 2:
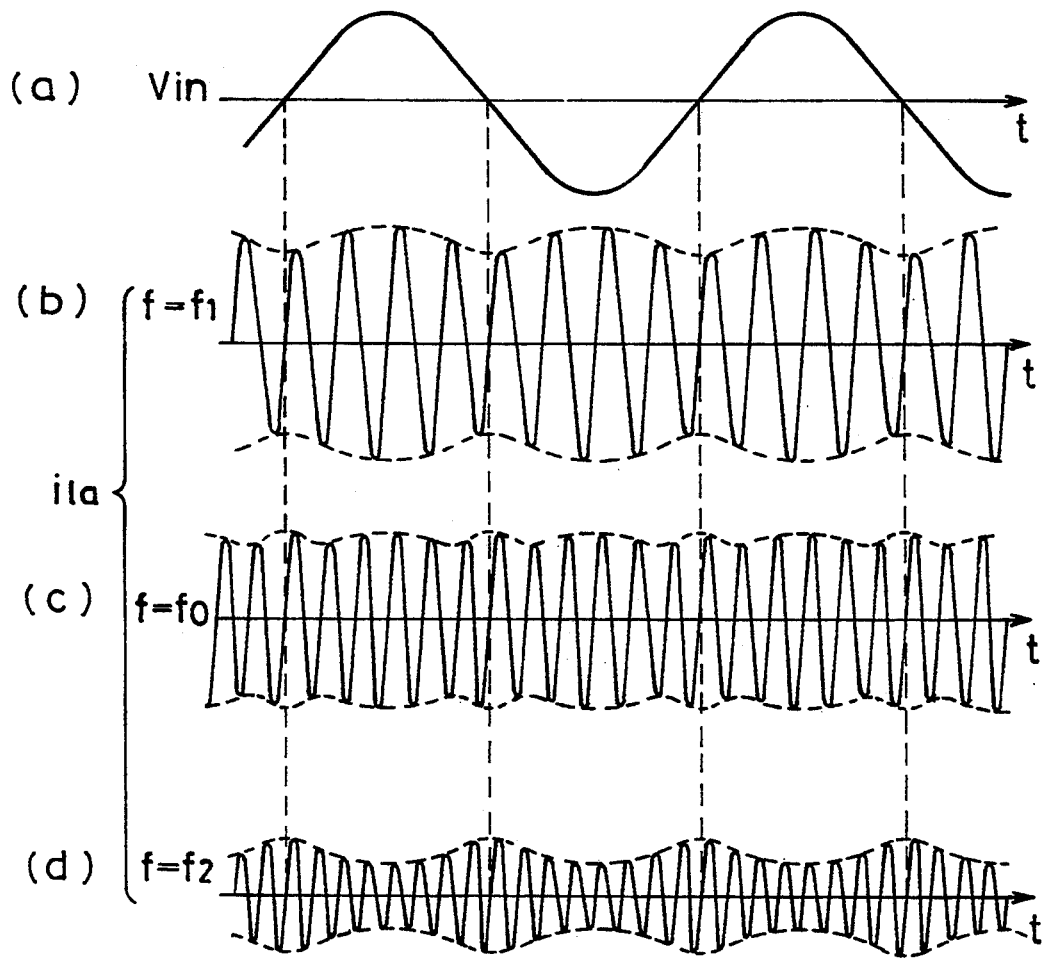
FIG. 2 shows in waveform diagrams the operation of the circuit in FIG. 1.
Figure 3:
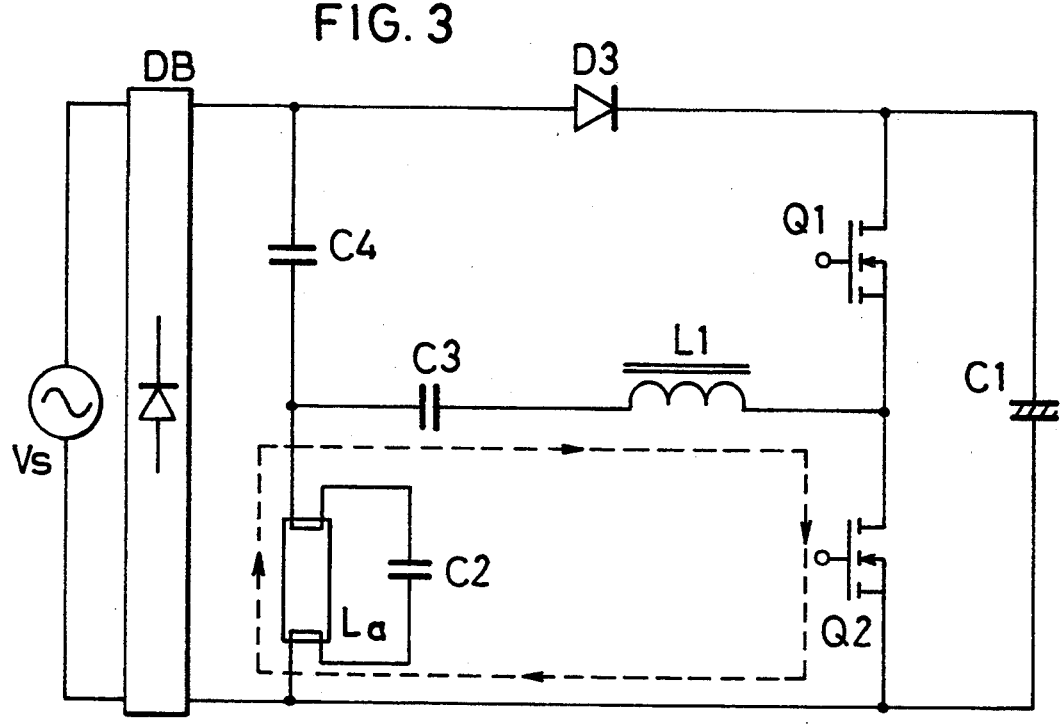
FIGS. 3 and 4 are explanatory circuit diagrams for mutually different operational modes of the embodiment in FIG. 1.
Figure 4:
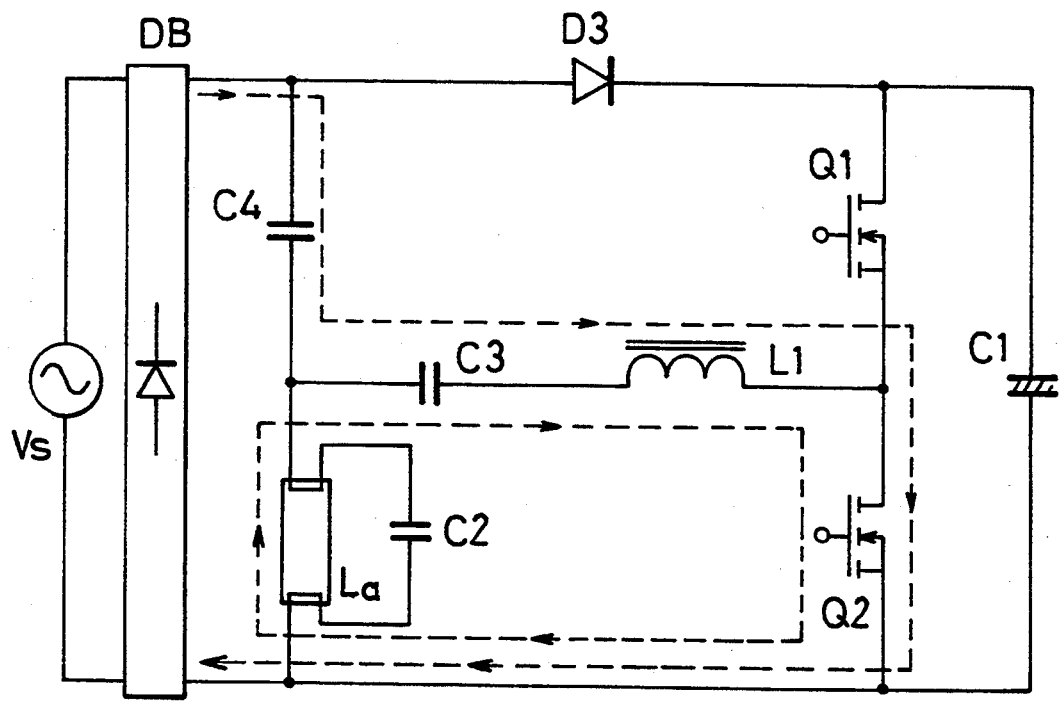

The charge and discharge of the capacitor C4 do not proceed at the same timing as the turning ON and OFF of the pair of switching elements Q1 and Q2 but are determined in the relationship of the voltage value with respect to a voltage $V_{C4}$ across the capacitor C4, source voltage $V_{in}$, voltage $V_{L1}$ across the inductor L1 and voltage $V_{C3}$ across the capacitor C3. That is, with the operating state changed over between those shown in FIGS. 3 and 4, the device output with respect to such source voltage $V_{in}$ as shown by a waveform (a) of FIG. 2 is caused to vary in envelope waveform of the output as shown by dotted lines of waveforms (b) to (d) of FIG. 2. In such state as shown by the waveforms (b) and (d) of FIG. 2, in particular, a difference between the maximum and minimum values of the envelope waveforms or, in other words, the ripple component becomes remarkable. Considering now of a case in which the second switching element Q2 is ON, there are present two operational modes, one of which is of a first oscillatory system, as shown by a dotted line in FIG. 3, of a current flowing through a path of the capacitor C3, resonance inductor L1, second switching element Q2, resonance capacitor C2 and such load La as a discharge lamp, and the other of which is of a second oscillatory system, as shown by a dotted line in FIG. 4, to which a path from the diode bridge DB, capacitor C4, capacitor C3, inductor L1 and second switching element Q2 is added, and the circuit operation is changed over between these two modes within each turning cycle of the pair of switching elements while change-over timing is also varied by virtue of the magnitude of the source voltage $V_{in}$ in AC cycle. The second oscillatory system shown in FIG. 4 is connected through the diode bridge DB to a source so that, with the source voltage $V_{in}$ made larger, the term of each cycle of the second switching element Q2 being changed over to this second oscillatory system is prolonged, and the entire circuit arrangement is caused to be affected strongly by the second oscillatory system.

Figure 5:
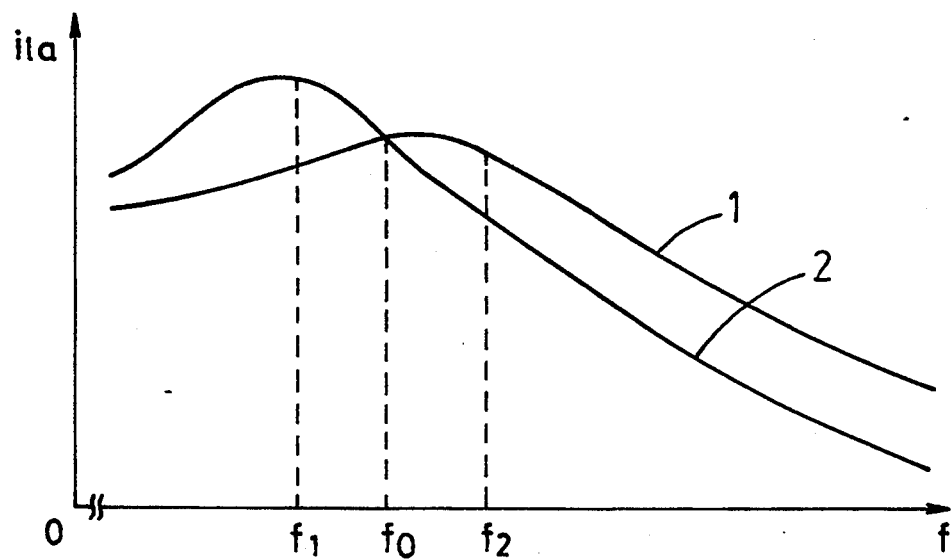
FIG. 5 is a characteristic diagram in respect of two oscillatory systems occurring in the circuit of FIG. 1 upon the different operational modes.

When on the other hand the load current $i_{1a}$ characteristics are obtained in respect of the first and second vibration systems independently, they will be as shown in FIG. 5. The load current characteristics of said first and second vibration systems are respectively shown by lines of 1 and 2 in FIG. 5. Here, the first oscillatory system is shown independently as in FIG. 6 while the second oscillatory system is as in FIG. 7. It is judged that, as seen in FIG. 5, the frequency f in which the ripple component of the load current $i_{1a}$ is the minimum as the waveform (c) of FIG. 2 is at a state where the characteristics of both oscillatory systems are substantially equal. This means that, at a state of $f=f_2$ where $i_{1a}$ in the first oscillatory system $> i_{1a}$ in the second oscillatory system, the load current $i_{1a}$ is greatly influenced by the second oscillatory system as the source voltage $V_{in}$ is made larger, and the waveform of the load current $i_{1a}$ becomes smaller as shown by (d) in FIG. 2 when the source voltage $V_{in}$ is large. When $f=f_1$ where $i_{1a}$ in the first oscillatory system $< i_{1a}$ in the second oscillatory system, contrarily, the load current $i_{1a}$ will increase as the waveform (b) in FIG. 2, as the source voltage $V_{in}$ increases. Accordingly, the state where the ripple component of the load current $i_{1a}$ becomes the minimum may be regarded to be that $f=f_0$ where $i_{1a}$ in the first oscillatory system is substantially equal to $i_{1a}$ the second oscillatory system.

Figure 8:
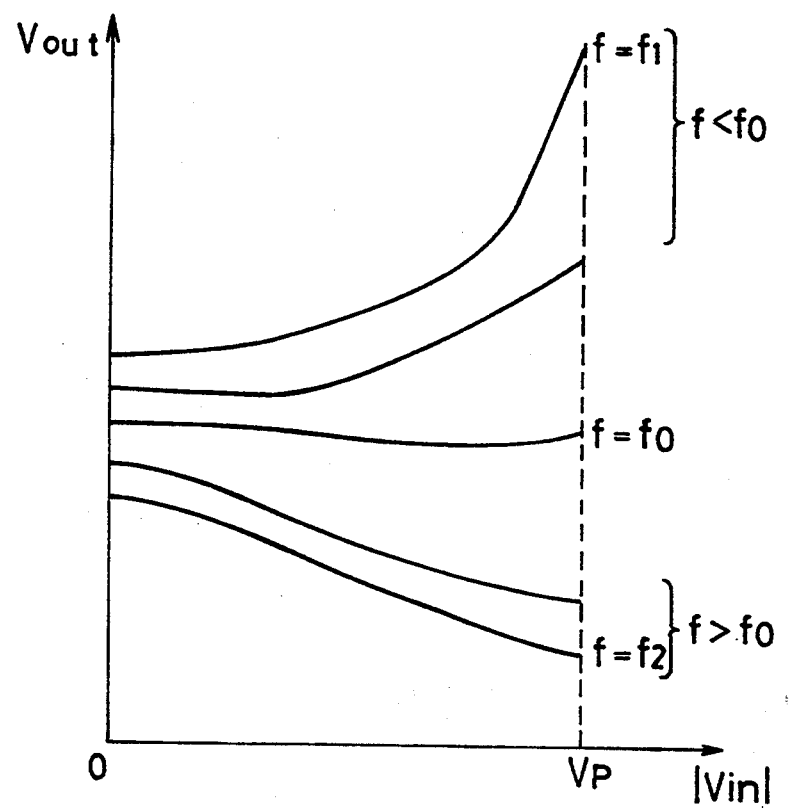
FIG. 8 is an output diagram of an inverter circuit included in the device of FIG. 1 with respect to a source voltage.
Figure 9:
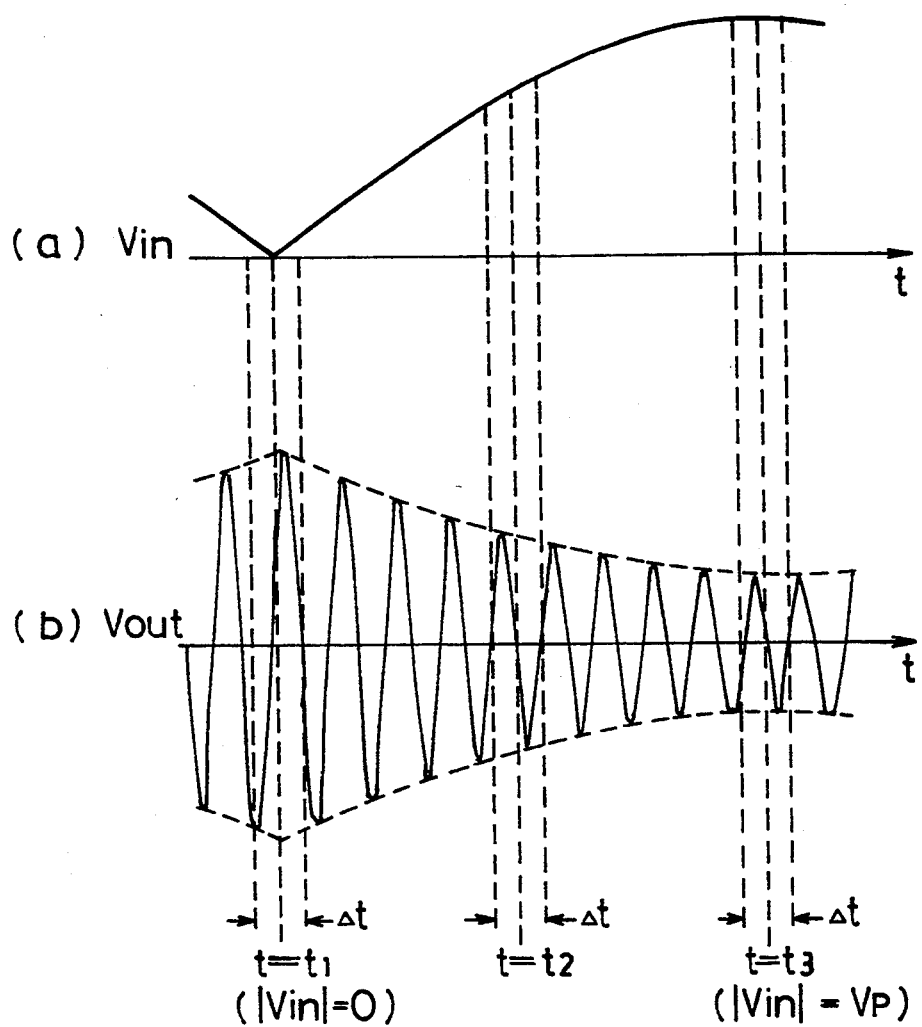
FIG. 9 is an explanatory waveform diagram for obtaining the output diagram of FIG. 8.

Since in this case one that directly contributive to the occurrence of the ripple component is the source voltage $V_{in}$, output characteristics of the source voltage $V_{in}$ (in practice, the absolute value $|V_{in}|$ of the source voltage $V_{in}$ because the source voltage is supplied through the diode bridge to circuits of following stages) and the inverter device have been obtained, which are as shown in FIG. 8, wherein the output (for example, the voltage across the load) is taken on the ordinate while the absolute value of the source voltage is taken on the abscissa. In the drawing, the respective absolute values are all momentary values, and the maximum value $V_p$ of the source voltage is also shown. More specifically, when in the inverter device of FIG. 1 the absolute value $|V_{in}|$ of the source voltage and an output voltage $V_{out}$ are in such state as shown in FIG. 9 the output $V_{out}$ at $|V_{in}|=0$ is obtainable from a value during a finely short time $\Delta t$ before and after $t=t_1$, the output $V_{out}$ at $|V_{in}|=V_p$ is obtainable also during the finely short time $\Delta t$ before and after $t=t_3$, and similarly the output $V_{out}$ at an optional $|V_{in}|$ is obtainable from a value also during the finely short time $\Delta t$ before and after a time when $|V_{in}|$ is reached (for example, $t=t_2$). Here, the finely short time $\Delta t$ should optimumly be set several times as large as the frequency of the switching elements used in the inverter circuit, to render any variation in $|V_{in}|$ to be of an ignorable level.

Figure 6:
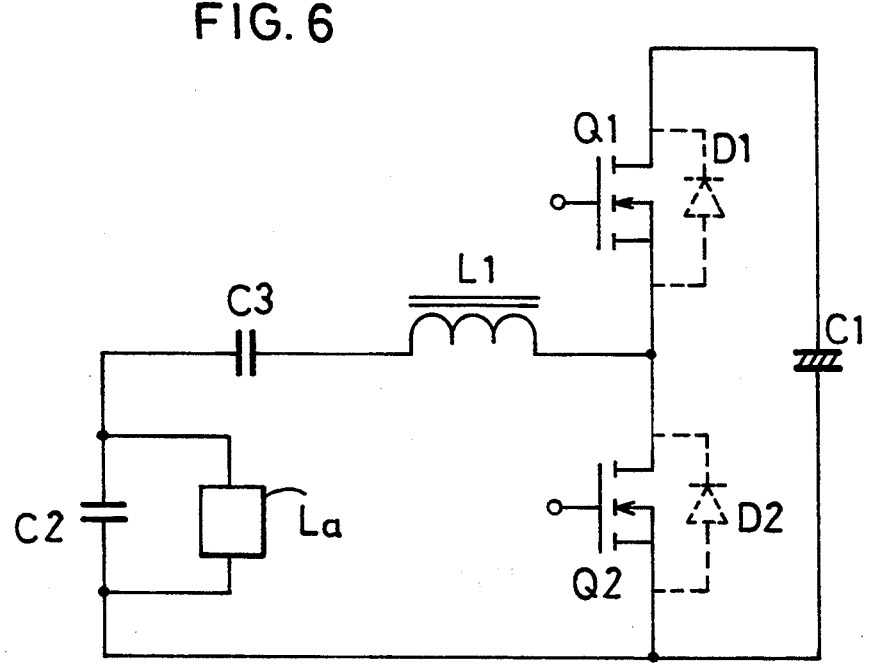
FIGS. 6 and 7 are circuit diagrams for explaining the two oscillatory systems occurring in the circuit of FIG. 1.
Figure 7:
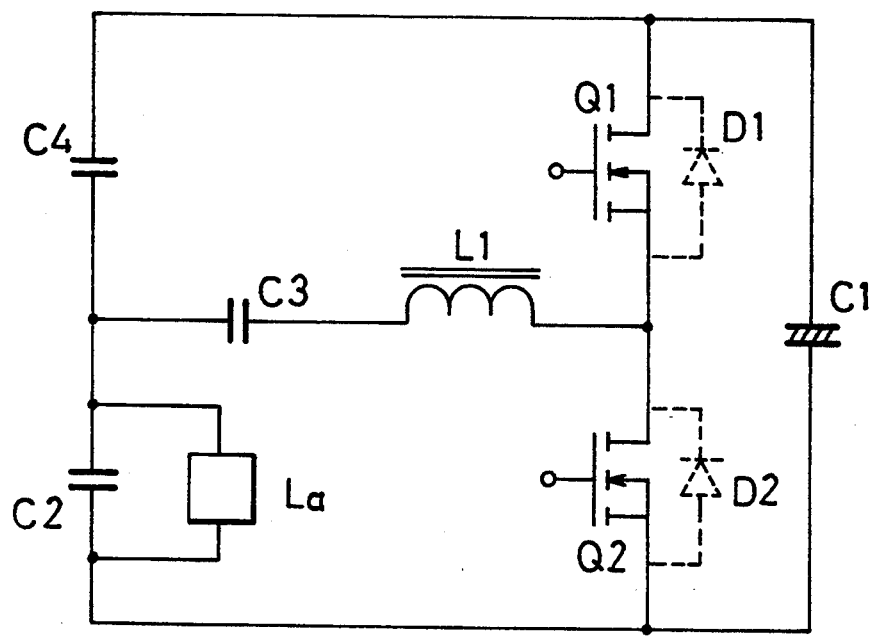

As will be apparent from FIG. 8, the output is made substantially constant when oscillation frequency of the inverter circuit 11 is made $f=f_0$, and the ripple component can be reduced. In the embodiment of FIG. 1 according to the present invention, there is provided a control means 11a so that the inverter circuit 11 will be operated at the frequency $f_0$ at which the outputs of the two oscillatory systems will be substantially equal to each other, whereby such change-over operation of the circuit as shown in FIGS. 6 and 7 can be carried out so as to minimize output fluctuation, and the ripple component can be reduced. When the inverter device according to the present invention is employed in, for example, the discharge lamp lighting device, therefore, it is made possible to restrain such problem as flickering, in particular, from occurring in the discharge lamp as the load La. It is of course possible to maintain the improvement in the input power-factor in similar manner as in the known art having applicable circuit thereto.

Figure 10:
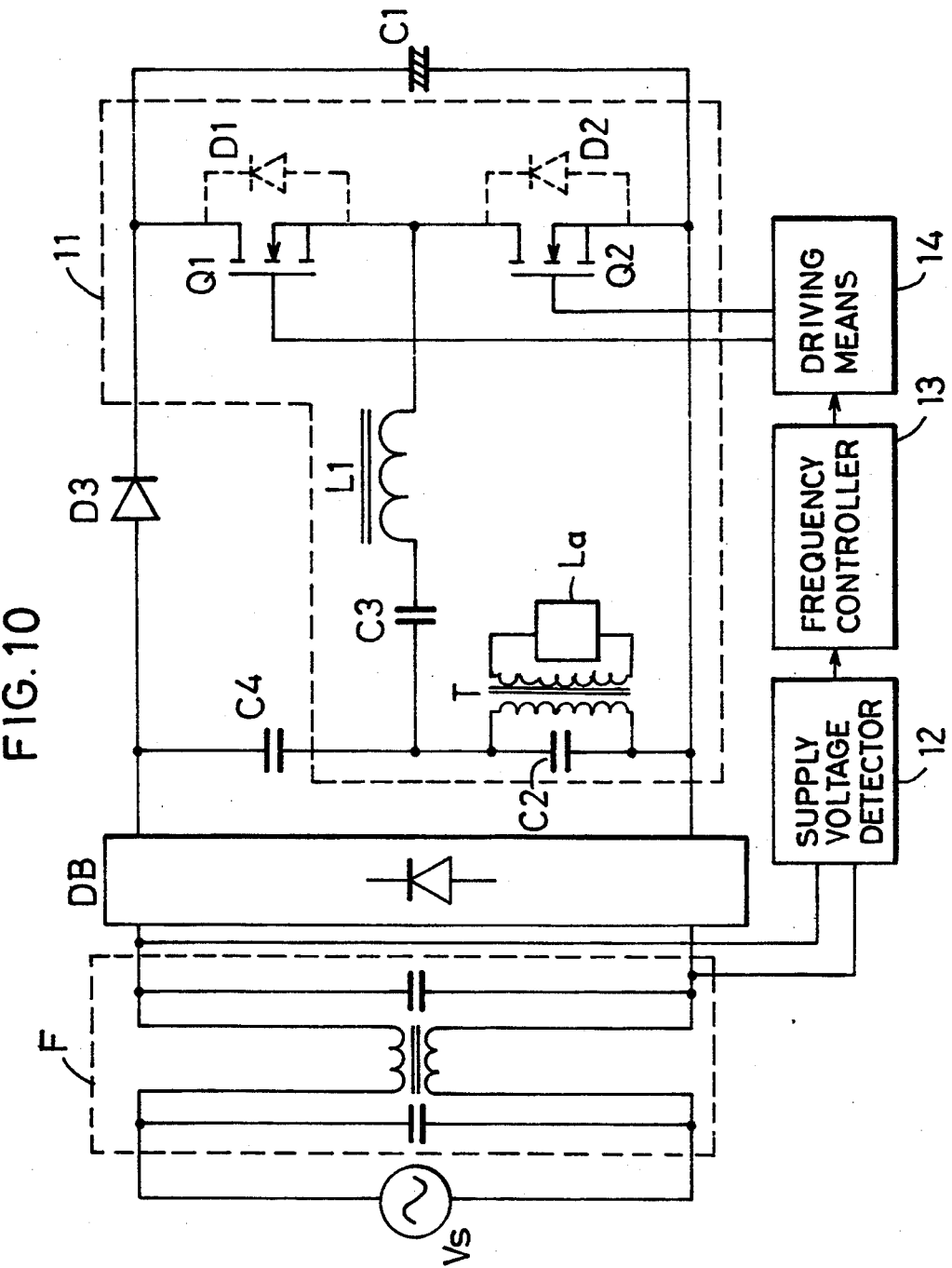
FIG. 10 shows in a circuit diagram another embodiment of the inverter device according to the present invention.

In an event when the foregoing inverter circuit 11 is operated at other oscillation frequency than $f=f_0$, the present invention is to adopt an arrangement for reducing the ripple component which becomes large as in (b) or (d) of FIG. 2 without any measure therefor. Referring to FIG. 10, the control means according to the present invention comprises a supplied voltage detector 12 for detecting the source voltage $V_{in}$, a frequency controller 13 for controlling the oscillation frequency f of the inverter circuit 11 in accordance with a detection output of the detector 12, and a driving means 14 for receiving an output of the frequency controller 13 and controllably driving the pair of switching elements Q1 and Q2. According to this arrangement of FIG. 10, therefore, the oscillation frequency f of the inverter circuit 11 can be varied in accordance with the variation in the source voltage $V_{in}$ which is concerned deeply in the occurrence of the ripple component, and it is made possible to effectively reduce the ripple component.

In the present embodiment, the load La is connected to the resonance capacitor C2 through the transformer T and is insulated from the source side, but the circuit operation does not differ from that of the aspect in which the load is directly connected in parallel with the capacitor C2. This applies also to a case where the capacitor C2 and load La are connected on non-source side of the transformer T, that is, on the secondary side.

Figure 11:
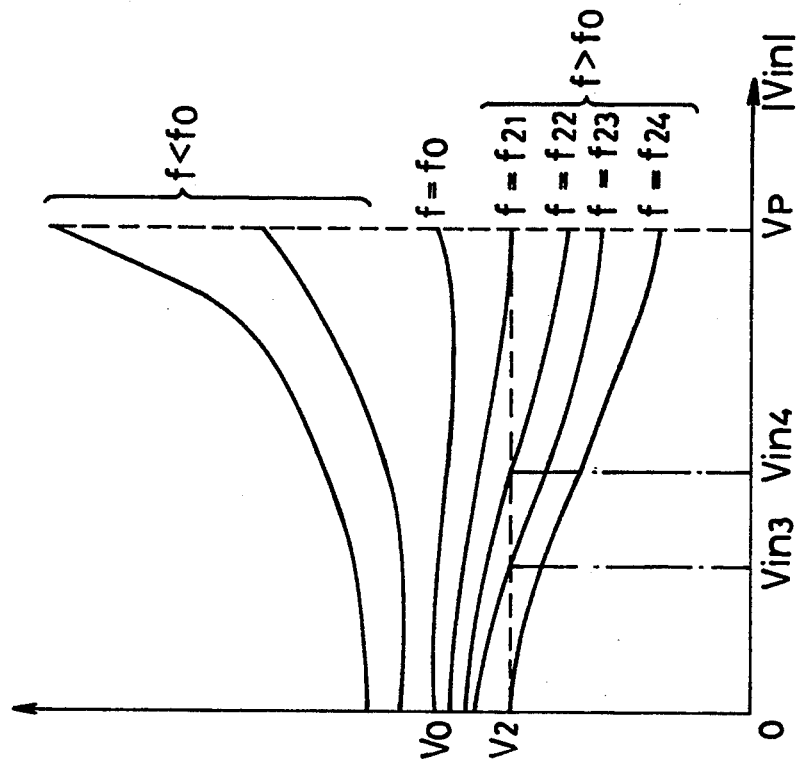
FIGS. 11 and 12 are different output characteristic diagram with respect to a rectified output in the circuit of FIG. 10.

More specifically, the relationship between the source voltage $V_{in}$ and the output of the inverter circuit 11 in respect of other frequencies f than the frequency $f_0$ at which the ripple component can be reduced, has been obtained, resultant curves of which are as shown in FIG. 11. As will be evident from the drawing, there are shown such characteristics that the output $V_{out}$ is also made larger as the source voltage $V_{in}$ increases when the oscillation frequency f of the inverter circuit 11 is made to be $f<f_0$, and that the increase in the output $V_{out}$ is made larger as the oscillation frequency f separates from $f_0$ (i.e., $f_{11}<f_{12}<f_{13}<f_{14}<f_0$). Assuming here, for example, that the output $V_{out}$ is $V_1$ with the source voltage $V_{in}$ made 0 at the frequency $f_{11}$, the output $V_{out}$ can be made to be $V_1$ by varying the oscillation frequency f of the inverter circuit 11 in response to the source voltage $V_{in}$ as will be clear from FIG. 11. Assuming further that the source voltage is $V_{in1}$ and the oscillation frequency f of the inverter circuit 11 is $f_{12}$, the output $V_{out}$ is made $V_1$, or, when the source voltage is $V_{in2}$ and the oscillation frequency f of the inverter circuit 11 is $f_{13}$, then the output $V_{out}$ is also made $V_1$.

In this case, in the embodiment of FIG. 10, the oscillation frequency f of the inverter circuit 11 is smoothly varied by means of the frequency controller 13 in accordance with the variation in the source voltage $V_{in}$. That is, as will be readily appreciated, the oscillation frequency f of the inverter circuit 11 is kept lower in the period when the source voltage $V_{in}$ rises but, to the contrary, as the source voltage $V_{in}$ falls, the oscillation frequency f of the inverter circuit 11 is raised.

Figure 12:
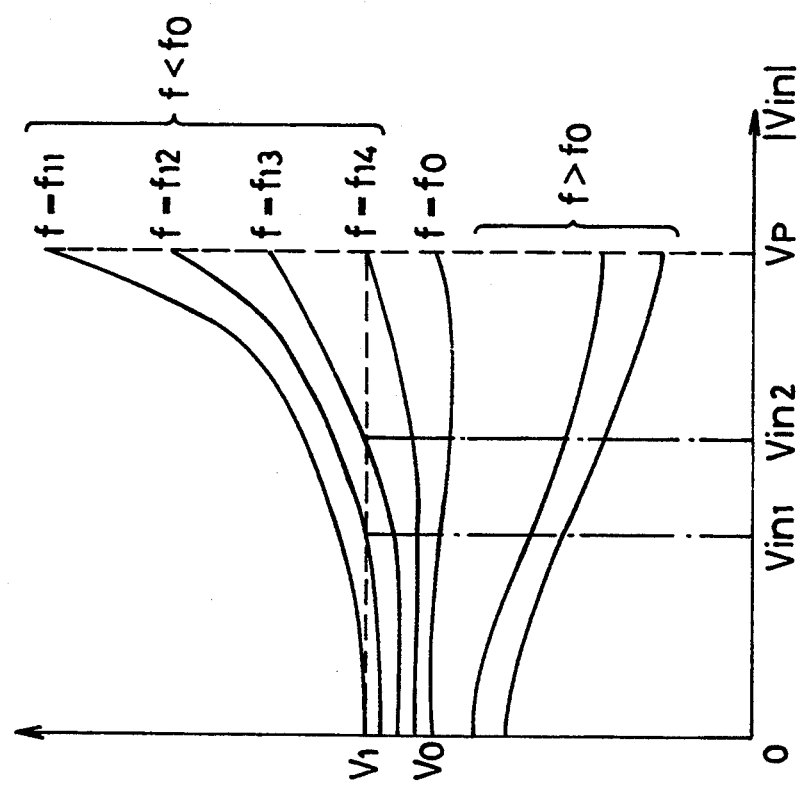

While in the above the reference has been made to the controlling of the output $V_{out}$ to be constant at the oscillation frequency f lower than the frequency $f_0$ minimizing the ripple component, it is made possible with the same arrangement to control the output $V_{out}$ to be constant at the frequency f higher than the frequency $f_0$ which minimizes the ripple component as shown in FIG. 12 ($f_{21}$-$f_{24}$: here $f_0<f_{21}<f_{22}<f_{23}<f_{24}$).

Figure 13:
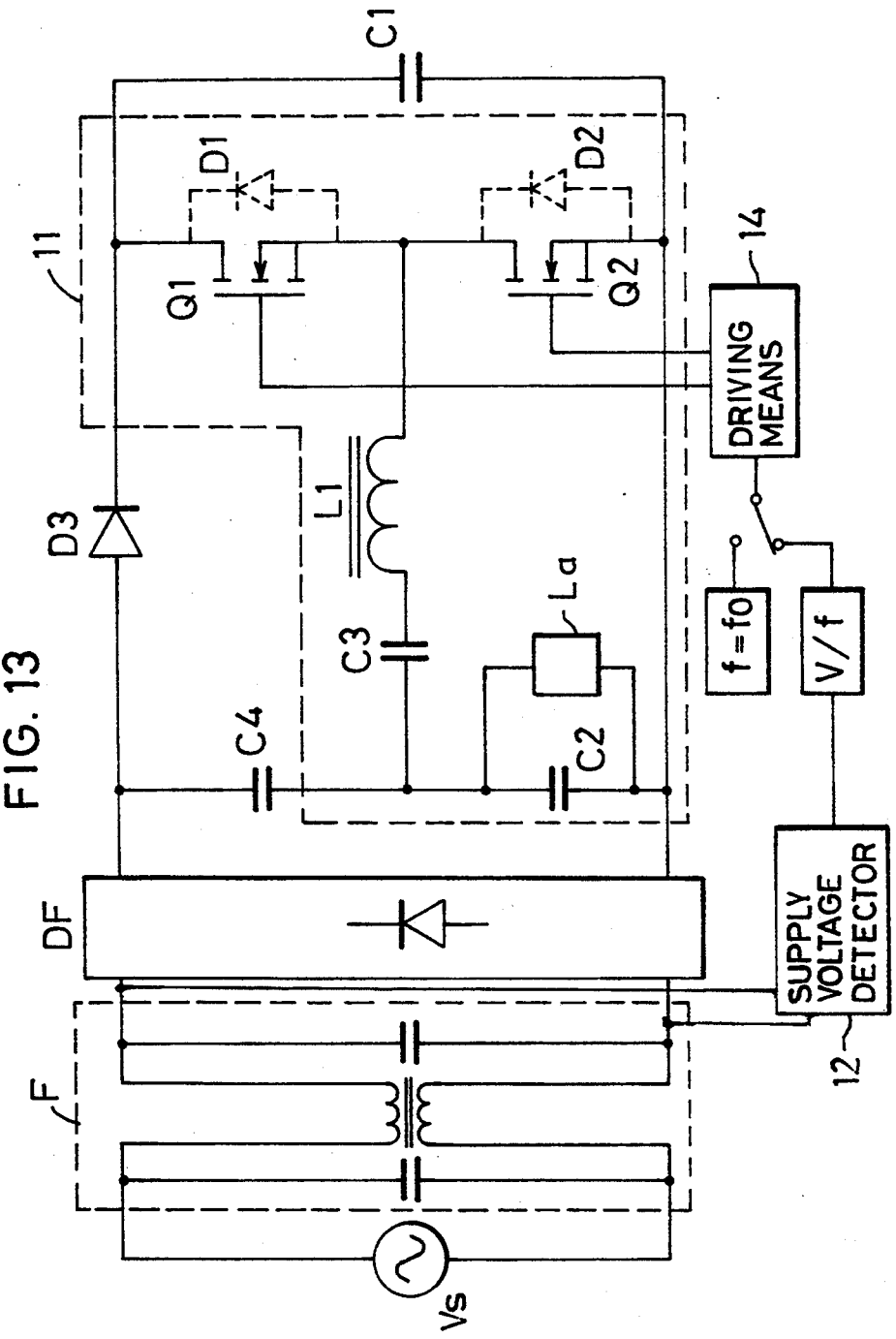
FIGS. 13 through 36 are circuit diagrams showing other embodiments of the inverter device according to the present invention.

While it is preferred that the oscillation frequency f of the inverter circuit 11 in accordance with the source voltage $V_{in}$ is selected to be one obtained from the characteristics of FIGS. 11 and 12, it is also possible to remarkably reduce the ripple component even with a measure of varying the frequency substantially in proportion to the source voltage $V_{in}$ as compared with an event where the frequency is not controlled. Further, there is a difference in the output $V_{out}$ in the event where the oscillation frequency f is made $f_0$ as is clear in FIG. 8, from that in an event where the frequency f is made variable but the output $V_{out}$ of the inverter circuit 11 is kept constant to be $V_1$ and $V_2$ as has been described with reference to FIGS. 11 and 12. Accordingly, it is possible to obtain the output $V_{out}$ of the inverter circuit 11 while sufficiently reducing the ripple component by employing a control means in which the foregoing arrangement of FIG. 8 and the further arrangement described with reference to FIGS. 11 and 12 are combined as shown in FIG. 13.

Figure 14:
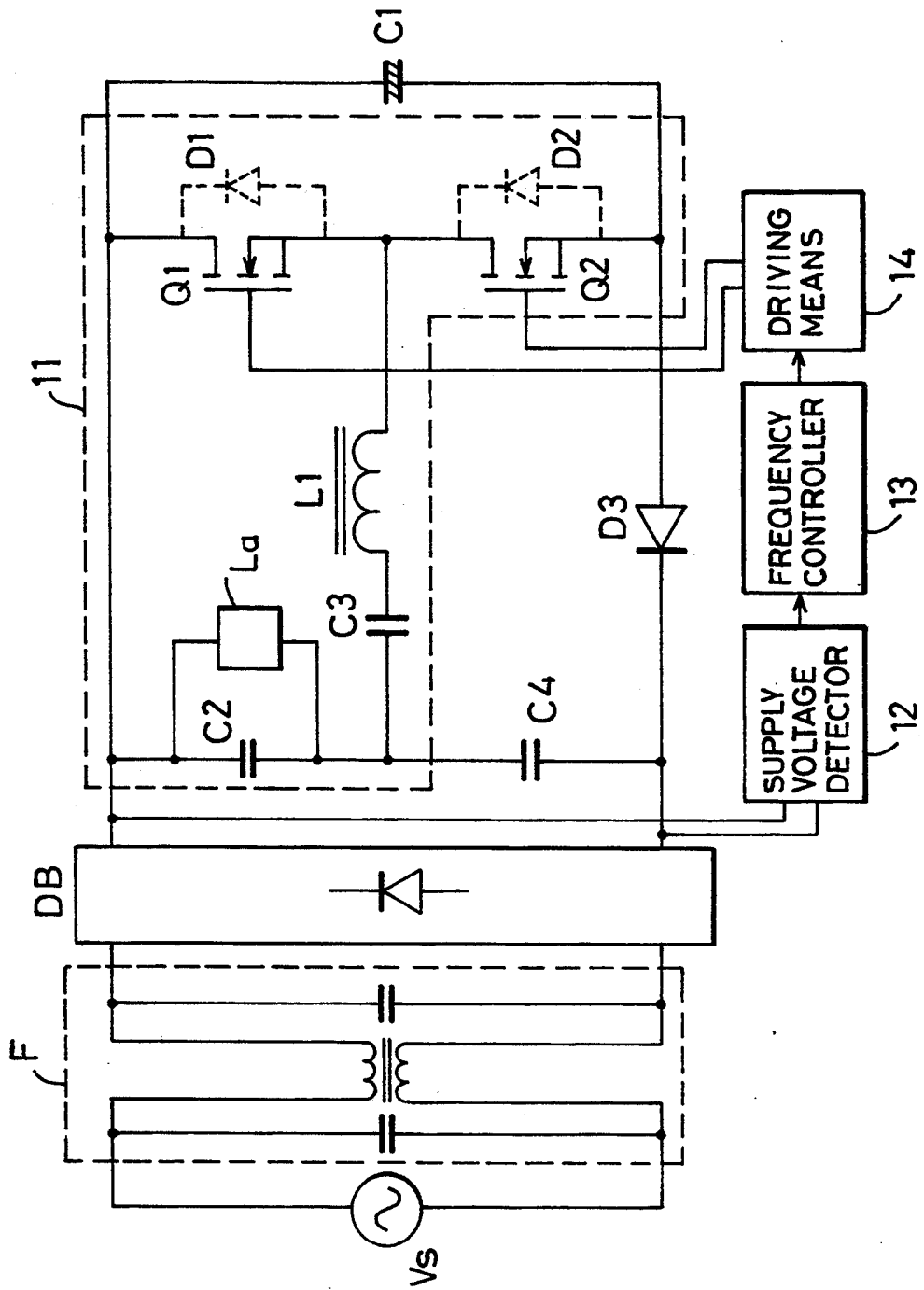

In a further embodiment shown in FIG. 14, the circuit arrangement is different from the foregoing embodiments in respect that the oscillatory system including the load La of the inverter circuit 11 is connected to the side of the first switching element Q1, connecting point of the capacitor C4 and the diode D3 as well as the direction of the diode D3 are modified in accordance with the above connection of the oscillatory system, and the source voltage $V_{in}$ is detected at output end of the diode bridge DB, but the operation of the inverter circuit 11 and the function of reducing the ripple component are substantially the same as the foregoing embodiments.

Figure 15:
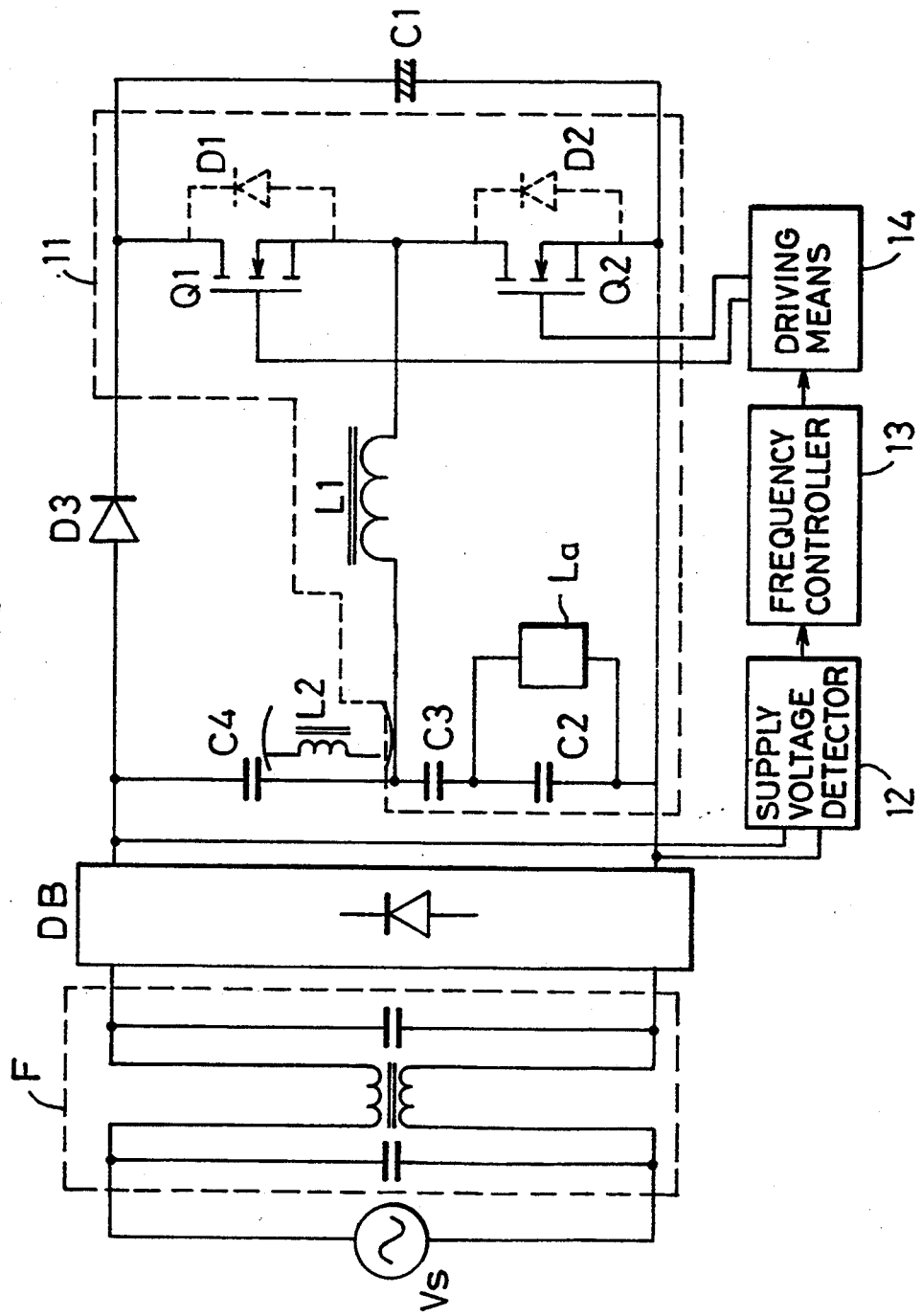

In another embodiment shown in FIG. 15, there are differences from the foregoing embodiments in respect of inserting position of the DC component cutting capacitor C3 and an additional connection, if occasion demands, of an inductor L2 in series with the impedance-use capacitor C4 (the inductor being shown as parenthesized in the drawing), while the operation of the inverter circuit 11 as well as the function of reducing the ripple component are substantially the same as those in the foregoing embodiments. It is also useful to additionally provide an inductor or capacitor in the oscillatory systems of the inverter circuit 11 in the device of the instant embodiment.

On the other hand, an event where the load La is the discharge lamp which is lighted for being dimmed shall be considered. In a discharge lamp lighting device of an inverter type having no input power-factor improving circuit comprising the capacitor C4 and diode D3, the dimming lighting can be executed with the power supplied to the discharge lamp made smaller by deviating the frequency from the resonance frequency of the first oscillatory system comprising the inductor L1 and capacitor C2. Here, in the foregoing inverter device of FIG. 1, a mere variation of the oscillation frequency of the inverter circuit causes the ripple component to be rather increased as has been referred to so as to cause the flickering to occur in the event where the discharge lamp is employed as the load La, upon which the impedance of the oscillatory systems and the frequency of the inverter circuit are both varied so as to render the output supplied to the discharge lamp as the load La and the ripple component to be smaller and to attain in the new circuit impedance the state of $f=f_0$, whereby a stable current can be supplied to the discharge lamp even in the dimming state, and the flickering or the like problem can be eliminated. In this case, there are enumerated two measures, in one of which the impedance of the oscillatory systems is varied, in accordance with which the oscillation frequency of the inverter circuit 11 is varied, and in the other of which the frequency of the inverter circuit 11 is varied, in accordance with which the impedance of the oscillatory systems is varied.

Figure 16:
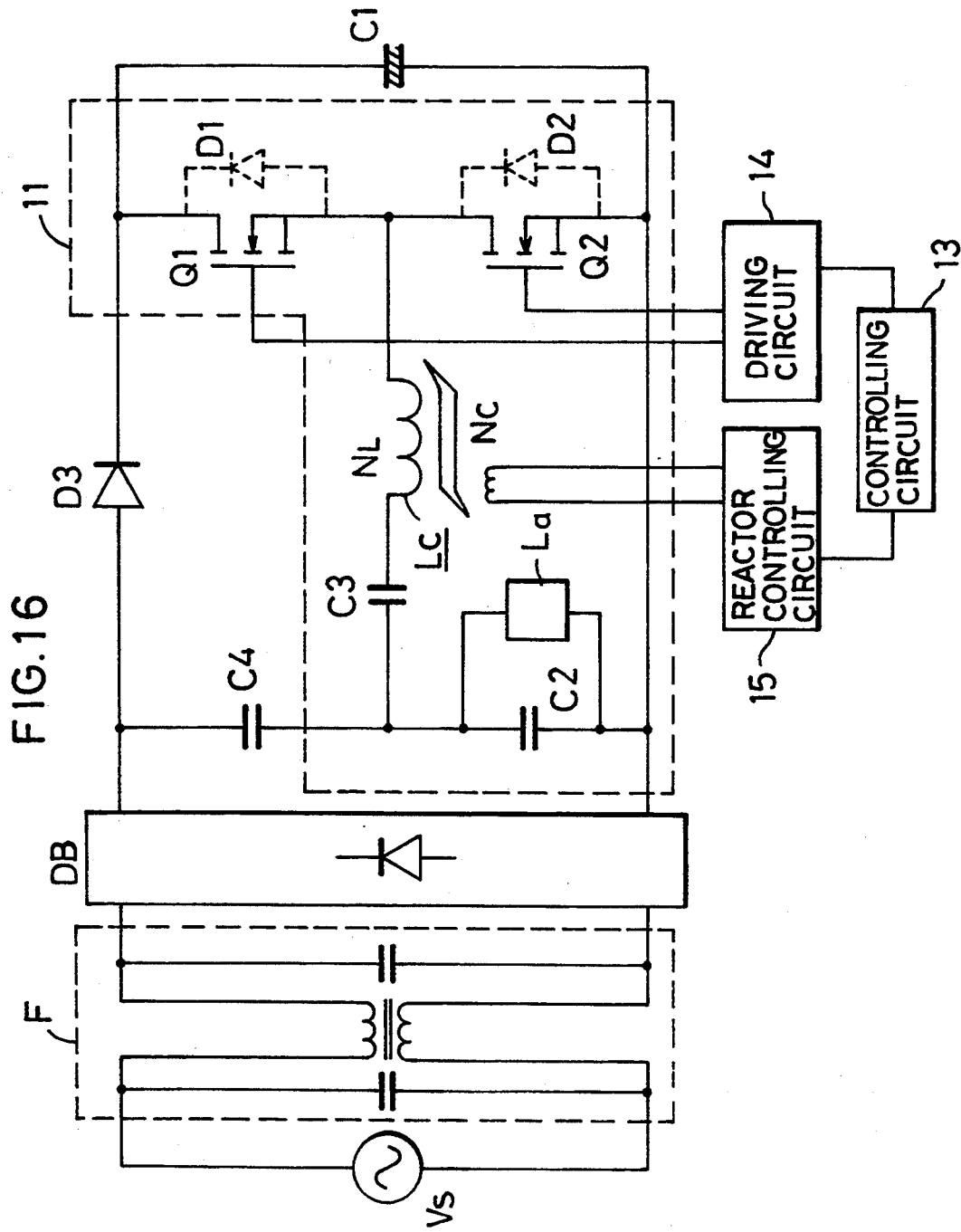

In another embodiment shown in FIG. 16, in contrast to the foregoing circuit arrangement in the embodiment of FIG. 1, there is employed a saturable reactor Lc in place of the inductor L1. The saturable reactor Lc comprises an output winding $N_L$ and a control winding $N_C$, a current passed through the control winding $N_C$ is varied by a reactor controlling circuit 15 and the inductance of the output winding $N_L$ is thereby made variable. The reactor controlling circuit 15 is provided for being controlled by the controlling circuit 13 for the operation of the switching elements Q1 and Q2, and the driving circuit 14 is to controllably drive the switching elements Q1 and Q2 inn accordance with the output of the control circuit 13.

In an event when the inverter device of FIG. 16 is employed as the discharge lamp lighting device for fully lighting the discharge lamp as the load La, the oscillation frequency of the inverter circuit 11 is made $f_0$, and the arrangement is so made that two oscillatory systems formed by the output winding $N_L$ of the saturable reactor Lc with the two capacitors C2 and C4 will provide substantially the same output as oscillated at the frequency $f_0$. In performing the dimming lighting, the current caused to flow through the reactor controlling circuit 15 to the control winding $N_C$ of the saturable reactor Lc is varied by the controlling circuit 13, to have the inductance value of the output winding $N_L$ varied, and at this time the oscillation frequency of the inverter circuit 11 is made variable by means of the controlling circuit 13 to render the outputs of the two oscillatory systems to be constant, whereby a power supply of less ripple component is realized and the discharge lamp as the load La can be subjected to the dimming lighting in a stable state. In this case, too, the improvement effect in the input power-factor by means of the input power-factor improving circuit can be maintained without being deteriorated.

Figure 17:
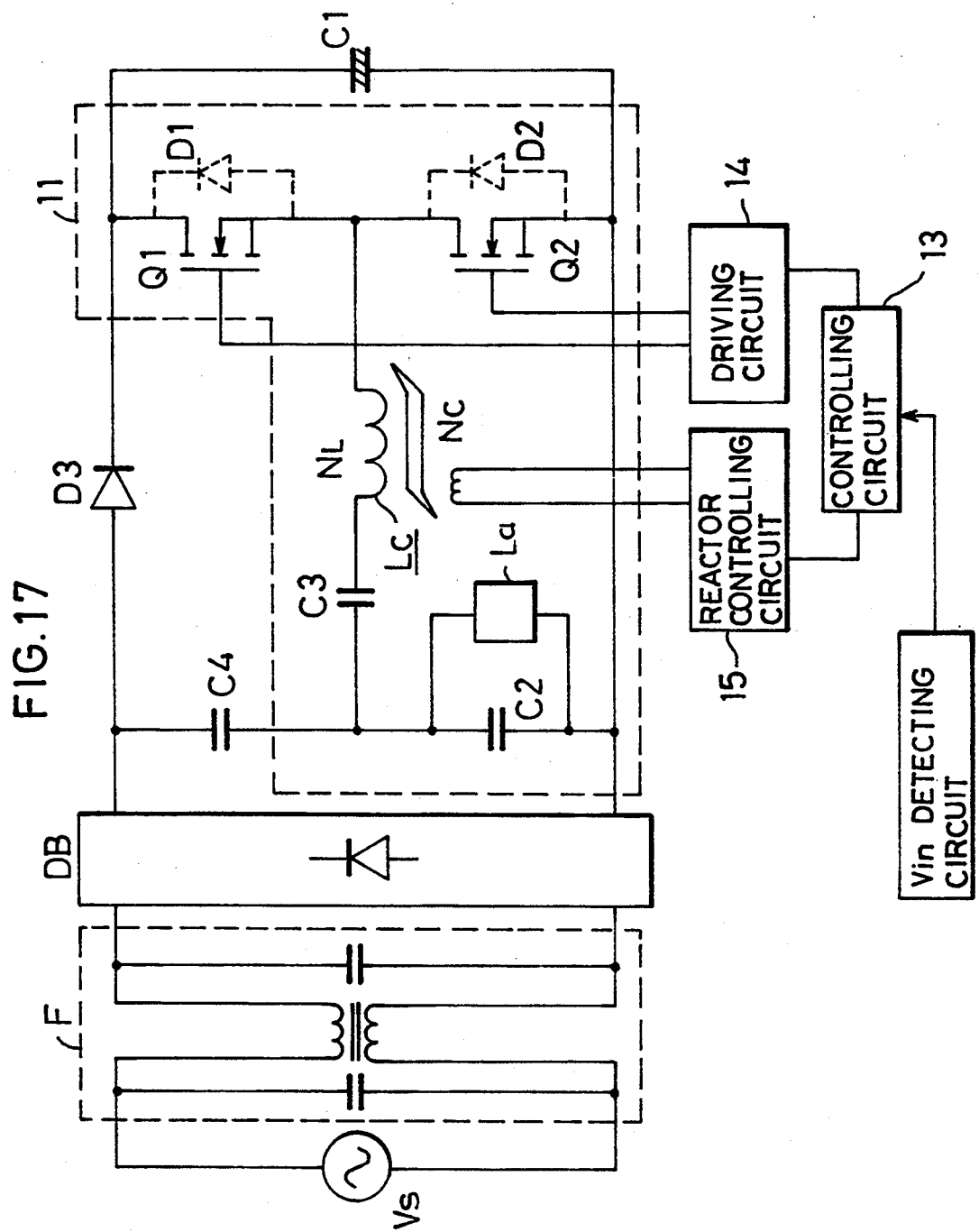

In performing the dimming lighting, further, the arrangement may also be so made that the oscillation frequency of the inverter circuit 11 is made variable as controlled by the controlling circuit 13, the current supplied through the reactor controlling circuit 15 to the control winding $N_C$ of the saturable reactor Lc by means of the controlling circuit 13 so as to substantially equalize the outputs of the two oscillatory systems under the variable frequency and to have the inductance value of the output winding $N_L$ varied, and the discharge lamp as the load La can be subjected to the dimming lighting with the ripple component reduced and in a stable state. Here, as the output of the inverter circuit 11 varies with the variation in the source voltage $V_{in}$ as seen in FIG. 8, it is also possible to arrange the device so that, as shown in FIG. 17, means for detecting the source voltage $V_{in}$ is provided to cause the controlling circuit 13 actuated to have the inductance value of the output winding $N_L$ varied through the reactor controlling circuit 15 in accordance with the variation in the source voltage $V_{in}$.

Figure 18:
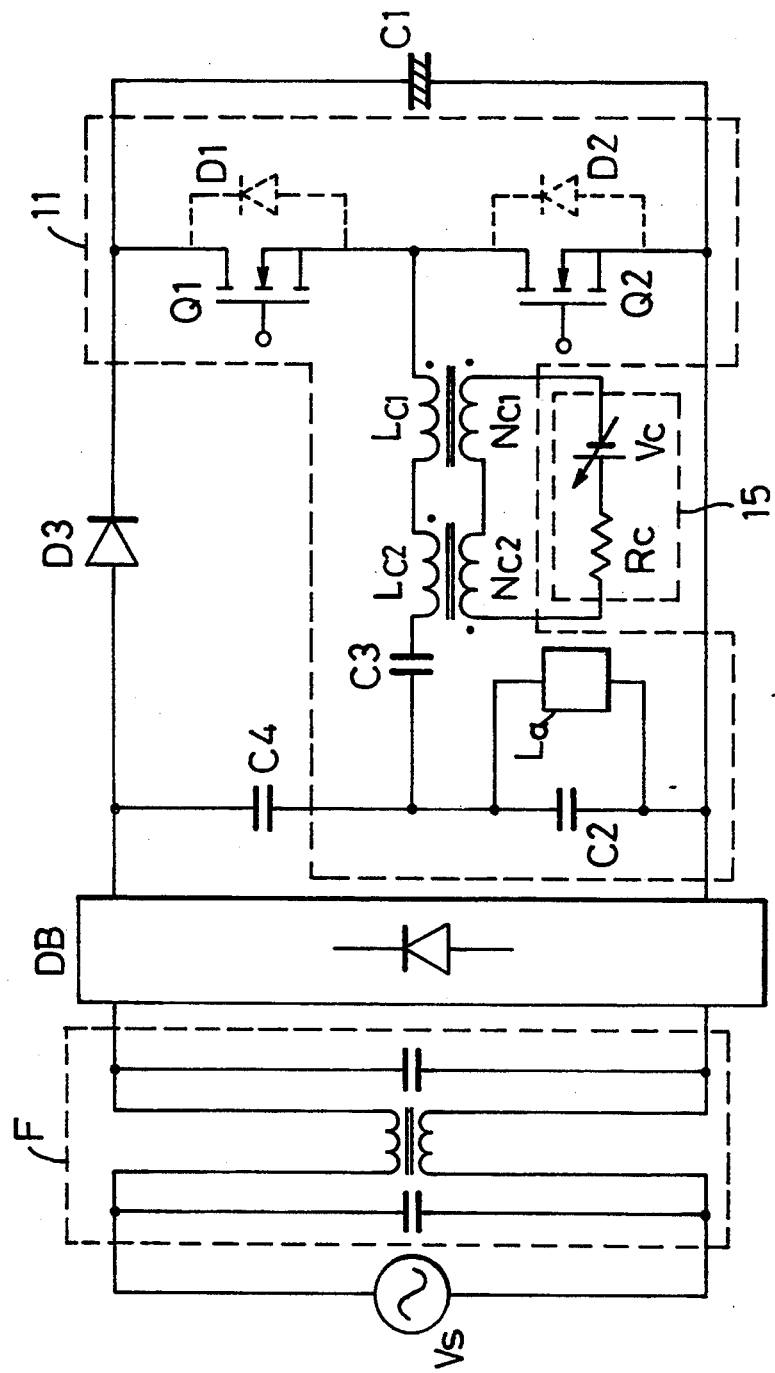

In still another embodiment shown in FIG. 18, more practical arrangement of the saturable reactor Lc and reactor controlling circuit 15 is proposed, in which the saturable reactor Lc is formed by two reactors $L_{C1}$ and $L_{C2}$, the control windings $N_{C1}$ and $N_{C2}$ of these reactors are reversed in the polarity and are connected to the reactor controlling circuit 15 shown in equivalent manner by a series connection of a resistor Rc and a control power source Vc which can freely vary applied voltage. According to this arrangement, saturating state of the output windings $N_{L1}$ and $N_{L2}$ is made gentle and the control becomes easier.

Figure 19:
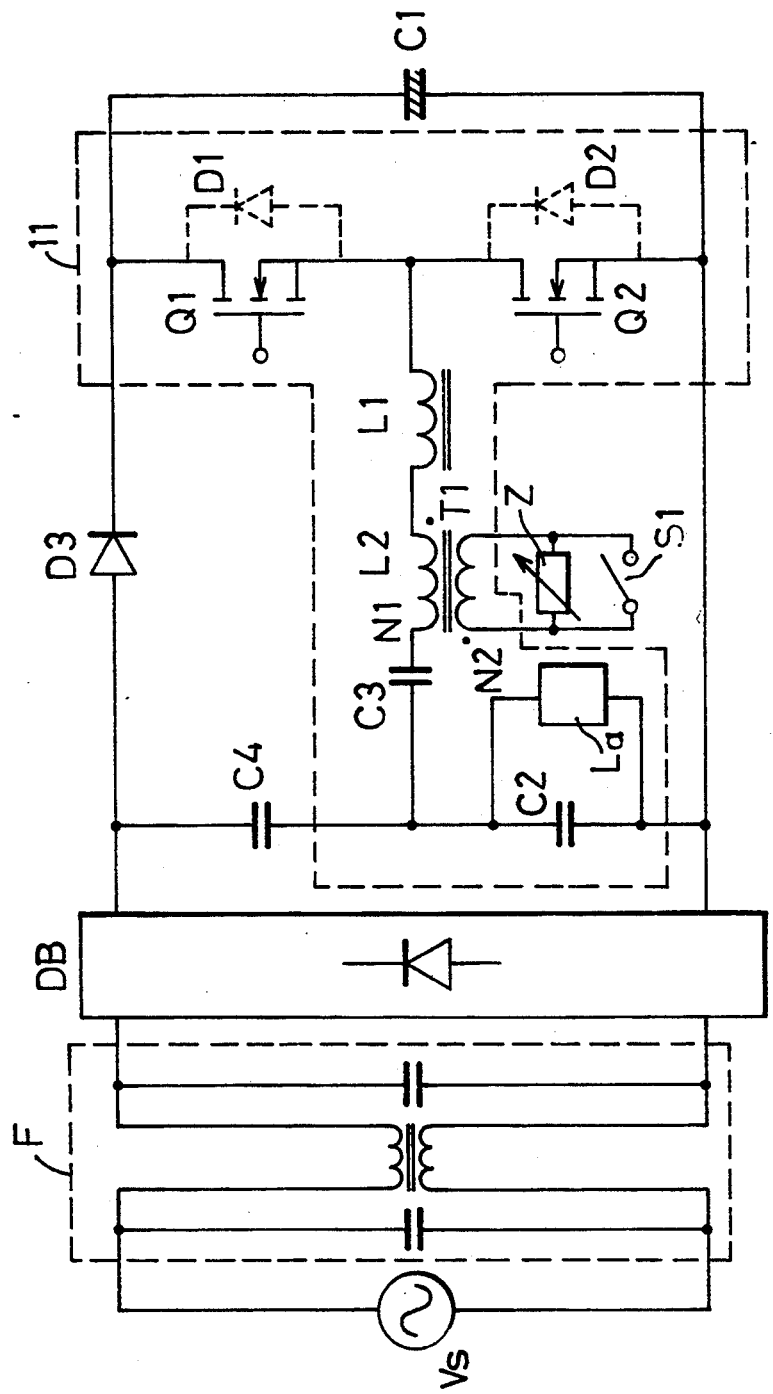

In another embodiment of the present invention as shown in FIG. 19, the saturable reactor Lc is replaced by a series connection of an inductance L1 and a primary winding N1 of a transformer T1 while a secondary winding N2 of the transformer is connected in parallel to a variable impedance Z and a switch element S1. Here, with the secondary winding N2 of the transformer T1 short-circuited by turning ON the switch element S1 connected across the secondary winding N2, there appears no inductance component of the primary winding N1, but there appears an inductance component L2 when the secondary winding N2 is opened, and the inductance value is made variable in a range from 0 to L2 by controlling the impedance value of the variable impedance element Z. That is, when the inductance values of the oscillatory systems and of the inductor L1 to be L and L1, respectively, they can be properly varied in a range of $Li<L<L1+L2$.

Figure 20:
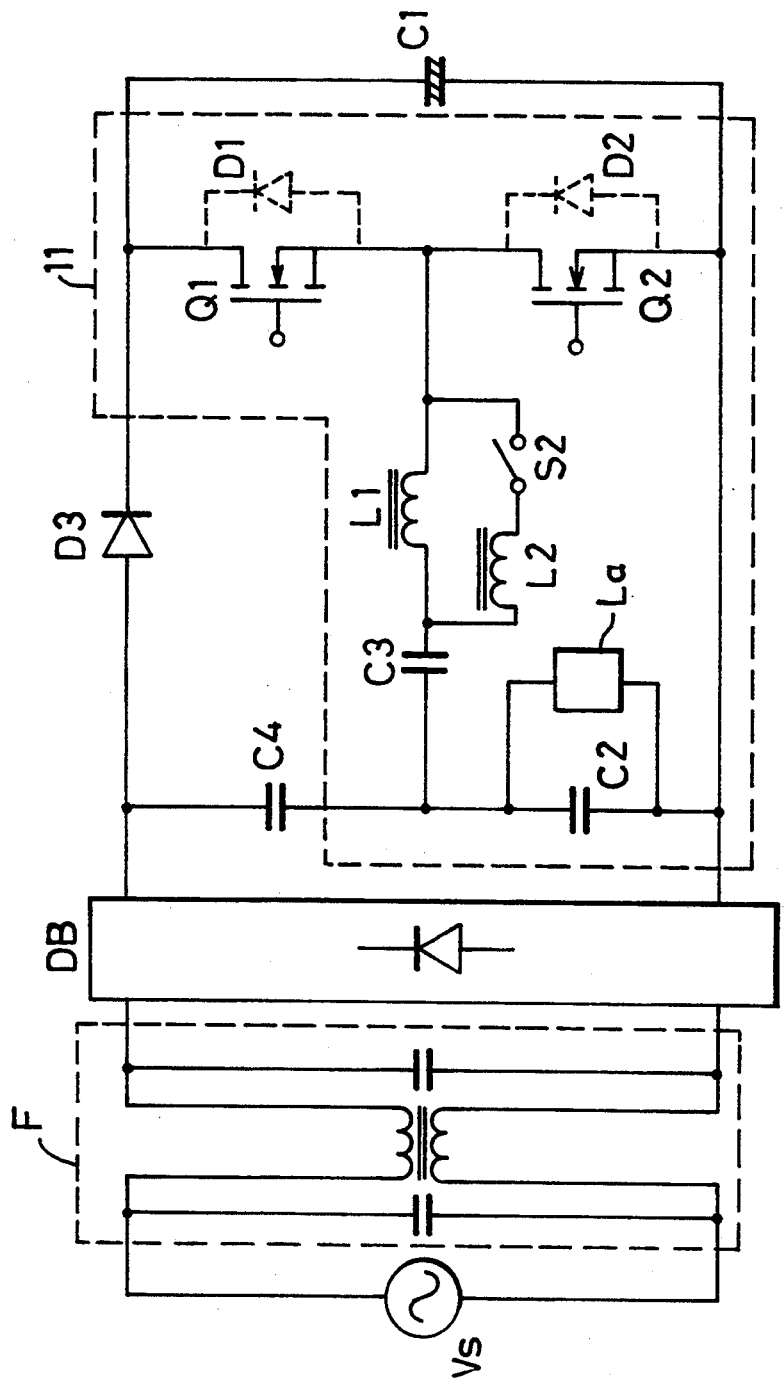

In another embodiment of the present invention as shown in FIG. 20, the inductor L2 can be connected through a parallel switch element S2 to the inductor L1. Here, the switch element S2 may be subjected to an ON/OFF control as controlled by, for example, such controlling circuit 13 as employed in FIG. 16. Accordingly, the inductance of the oscillatory system in OFF state of the switch element S2 will be that of the inductor L1 only, whereas the inductance of the oscillatory system upon turning ON of switch element S2 will be a composite of the inductances of the inductors L1 and L2.

While in the above the description has been made with reference to the case where the inductance of the oscillatory systems is varied for rendering the impedance of the oscillatory systems to be variable, it is also useful to vary the capacitance of the capacitor C4 or C2.

Figure 21:
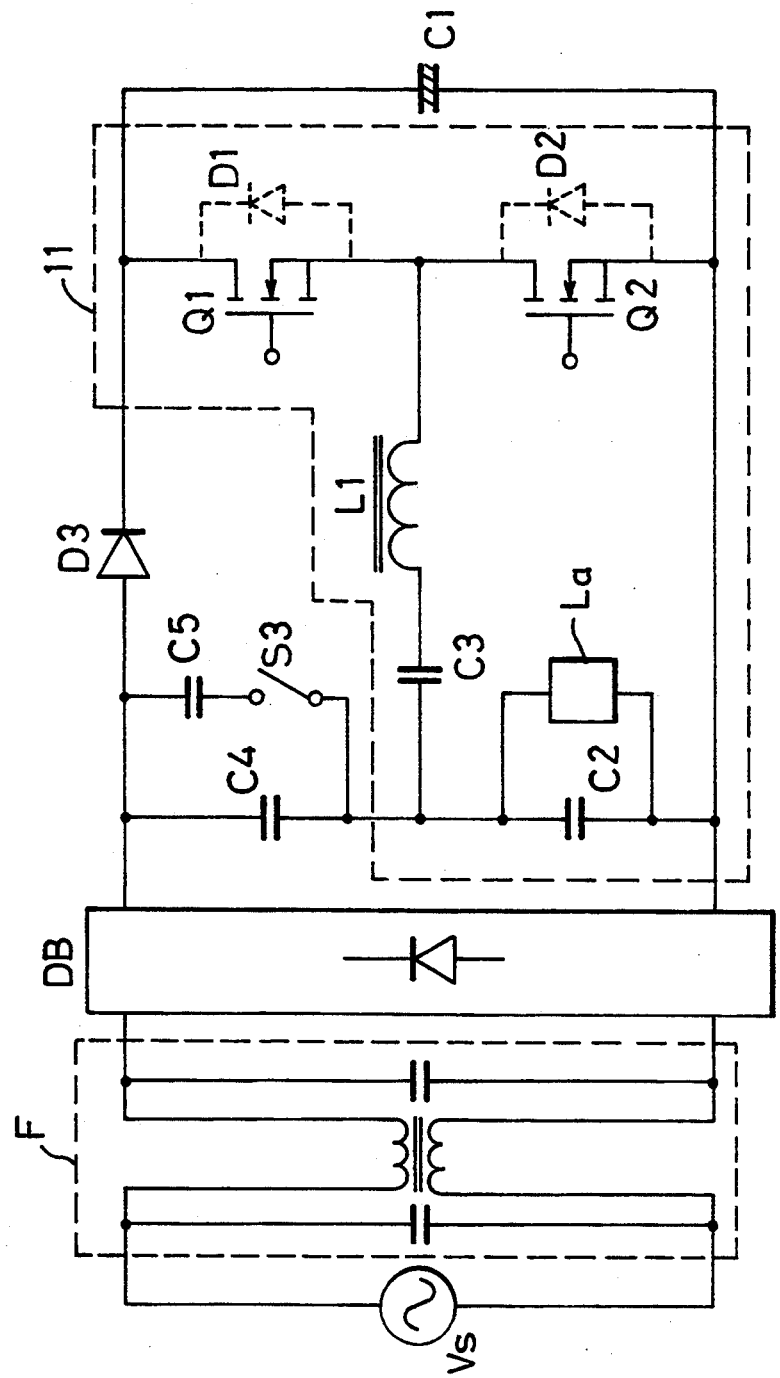

In another embodiment of the present invention shown in FIG. 21, a capacitor C5 and a switch element S3 are connected in parallel to the capacitor C4 used as an impedance element so as to be made ON and OFF under control preferably of such controlling circuit 13 as used in FIG. 16, and the impedance can be changed over with turning ON and OFF of the switch element S3.

Figure 22:
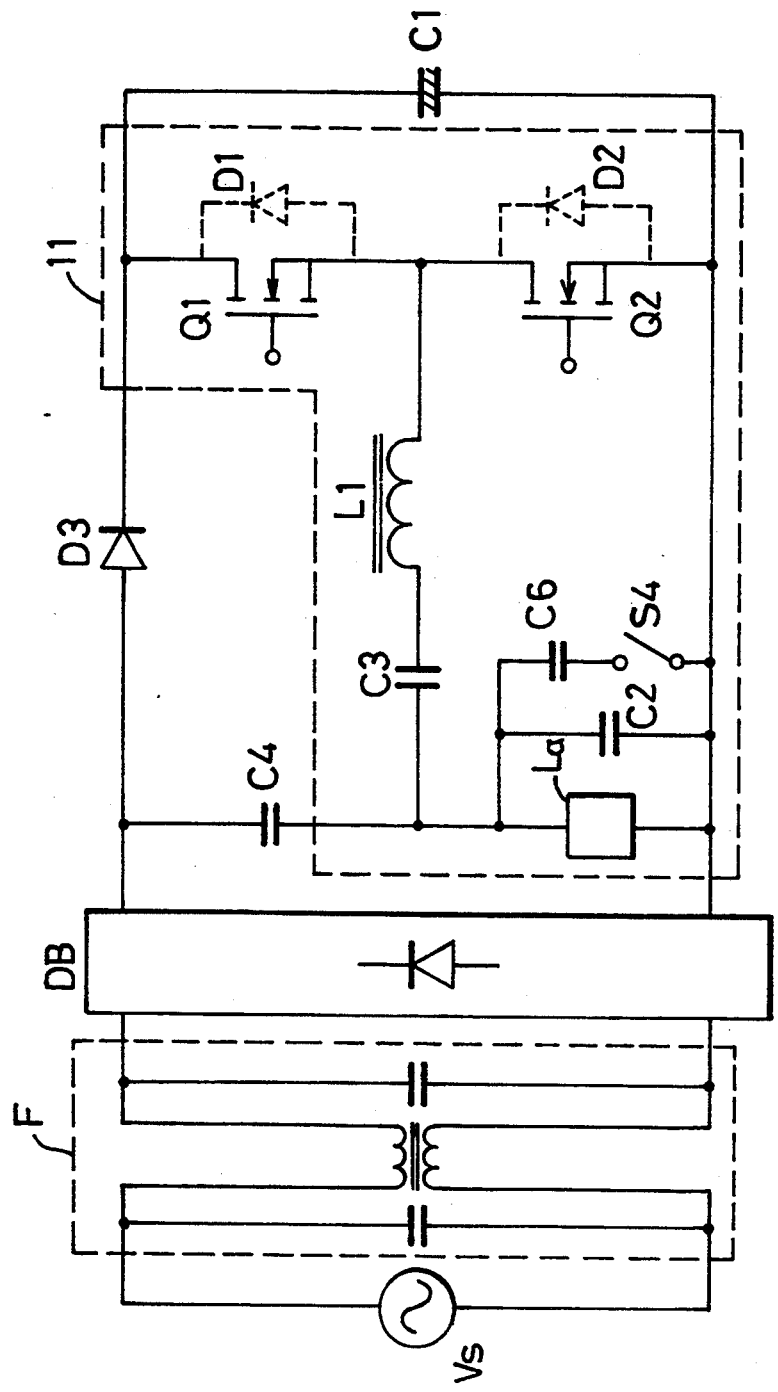

In a further embodiment of the present invention shown in FIG. 22, a series circuit of a capacitor C6 and a switch element S4 is connected in parallel to the capacitor C2, and the switch element S4 is made ON and OFF preferably under control of the controlling circuit 13 employed in FIG. 16 so that the impedance can be changed over.

Generally, it is not the case that charging timing of the capacitor C4 is simultaneous with the turning ON and OFF of the switching element Q1 and Q2 as has been referred to, but the timing is determined in relationship to a voltage $V_{C4}$ across the capacitor C4, source voltage $V_{in}$, voltage $V_{L1}$ across the inductor L1, and voltage $V_{C3}$ across the capacitor C3, and the change-over between the two oscillatory systems exerts an influence upon the occurrence of the ripple component. Speaking paradoxically, the output characteristics can be varied by controlling the charging and discharging timing of the capacitor C4 but, seemingly, it will be simpler to vary the impedance of the capacitor C4.

Figure 23:
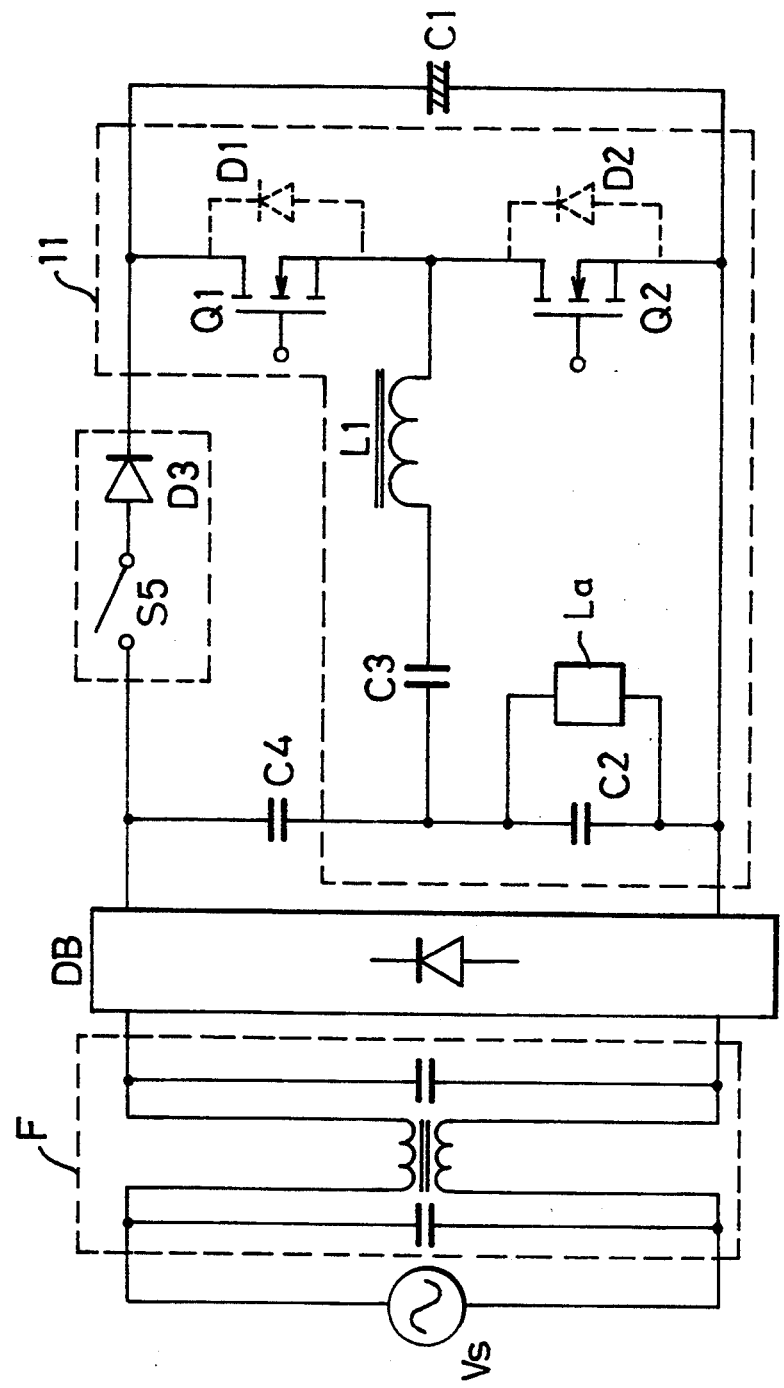

In still another embodiment shown in FIG. 23, there is taken a measure for substantially equalizing the outputs of the two oscillatory systems by controlling the charge and discharge time of the capacitor C4. In this case, a switch element S5 is connected in series to the diode D3, while these diode D3 and switch element S5 can be replaced by a unilateral switch element. In the embodiment of FIG. 23, the capacitor C4 is made dischargeable through the switching element Q1 when this switching element Q1 is turned ON and the switch element S5 is controlled, whereby the discharging ratio of the accumulated energy in the capacitor C4 is lowered, next chargeable quantity is made small, and both of the charging and discharging terms can be shortened. Thus the seeming capacity of the capacitor C4 can be varied, and the output involving less ripple component can be made obtainable by carrying out the control so as to substantially equalize the outputs of the two oscillatory systems in the same manner as in the embodiment of FIG. 21.

Figure 24:
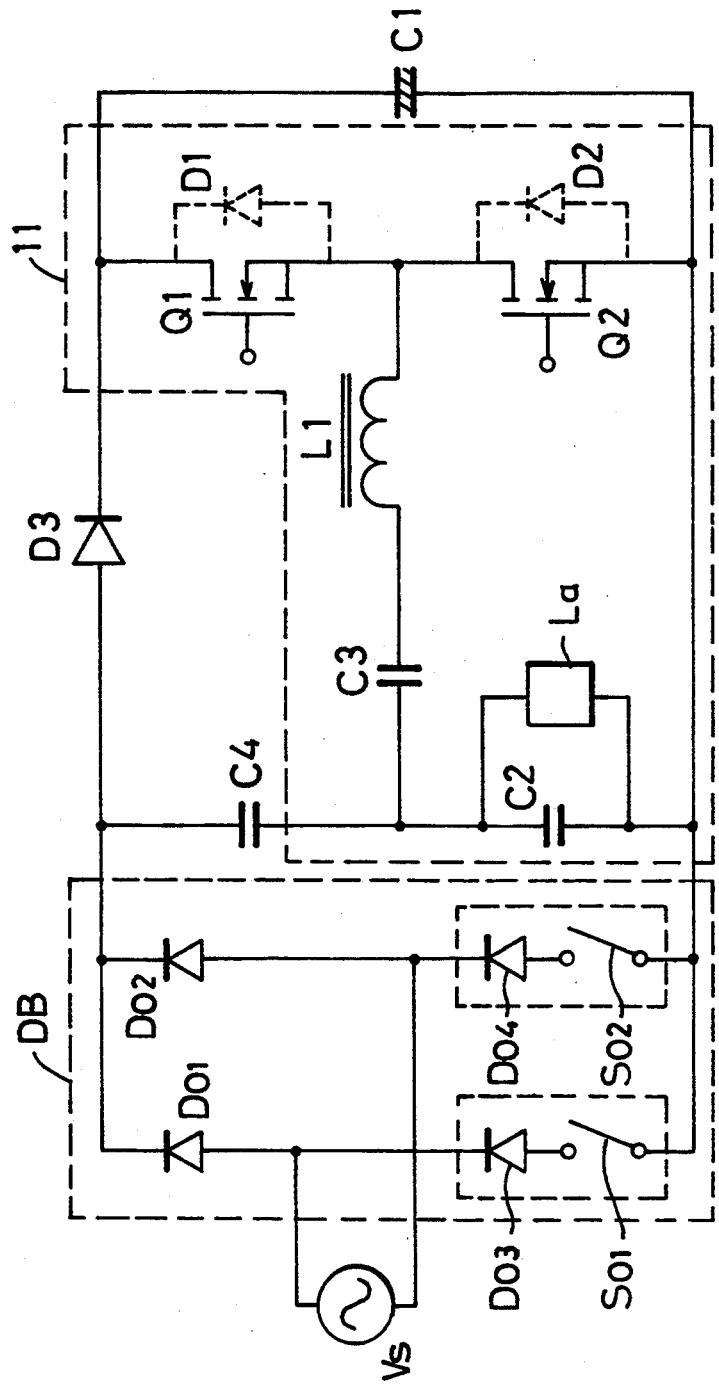

In another embodiment of the present invention shown in FIG. 24, there are connected two switch elements $S_{O1}$ and $S_{O2}$ respectively to each of diodes $D_{O3}$ and $D_{O4}$ constituting the diode bridge DB so that, as the switching element Q2 is turned ON, the charging and discharging of the capacitor C4 are controlled by means of the switch elements $S_{O1}$ and $S_{O2}$ on the basis of the foregoing relationship in the voltages. Here, the current flow to these switch elements $S_{O1}$ and $S_{O2}$ is changed over depending on the polarity of the source voltage but, as the operation of the diode bridge DB is to determine to which one of the switch elements $S_{O1}$ and $S_{O2}$ the current is to flow, there arises no problem even when both switch elements $S_{O1}$ and $S_{O2}$ are made ON and OFF in the same timing. By reducing the charging quantity for the capacitor C4 at this time, it is enabled to cause the next discharge timing of the capacitor C4 to be delayed, so as to have both terms of the charging and discharging shortened, and eventually the seeming capacity of the capacitor C4 is varied so that the output of less ripple component can be obtained in the same manner as in the foregoing embodiments.

Figure 25:
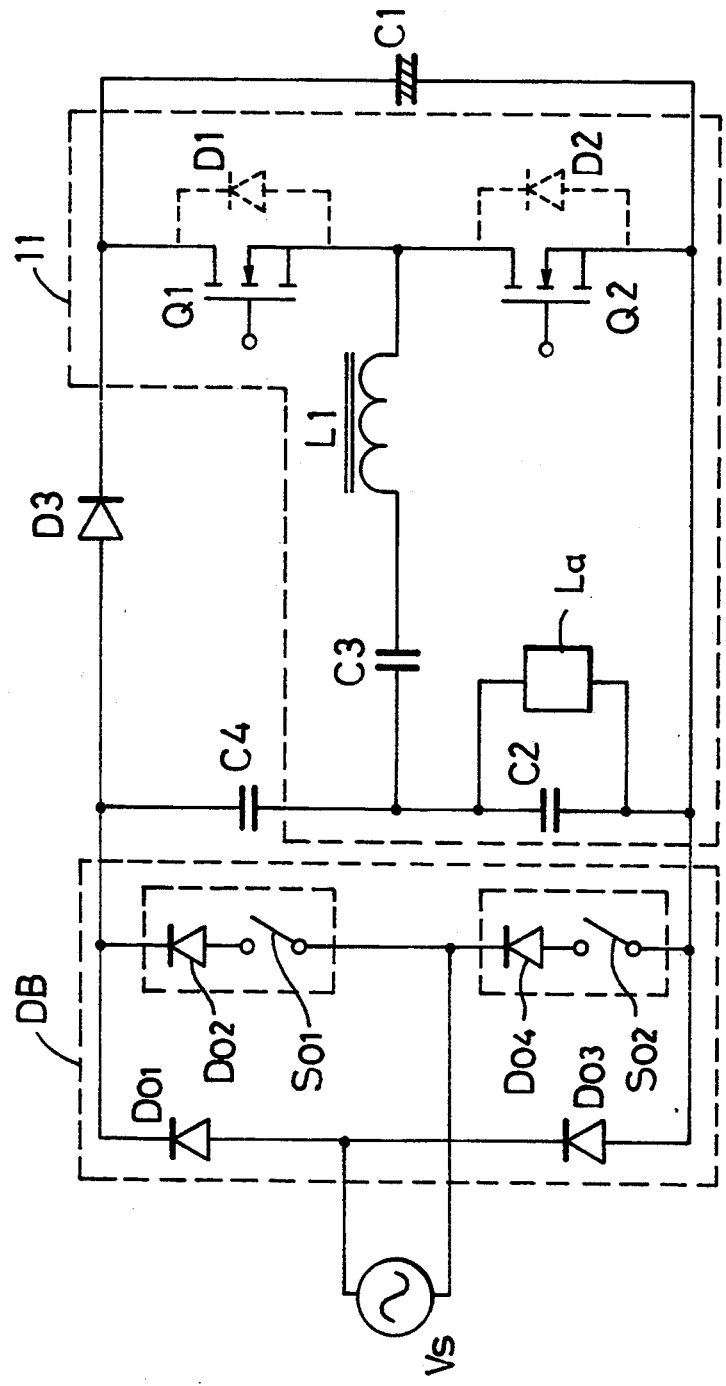

In a further embodiment of the present invention shown in FIG. 25, in contrast to the embodiment of FIG. 24, the switch element $S_{O1}$ is connected in series with another diode $D_{O2}$ in the diode bridge DB, and this arrangement still can be operated in the same manner as in FIG. 24. By the way, the respective switch elements S5, $S_{O1}$ and $S_{O2}$ in the embodiments of FIGS. 23 to 25 are capable of preventing any rush current from flowing upon connection to the power source, since they are made to turn ON in synchronism with zero-cross point of the AC source Vs.

Figure 26:
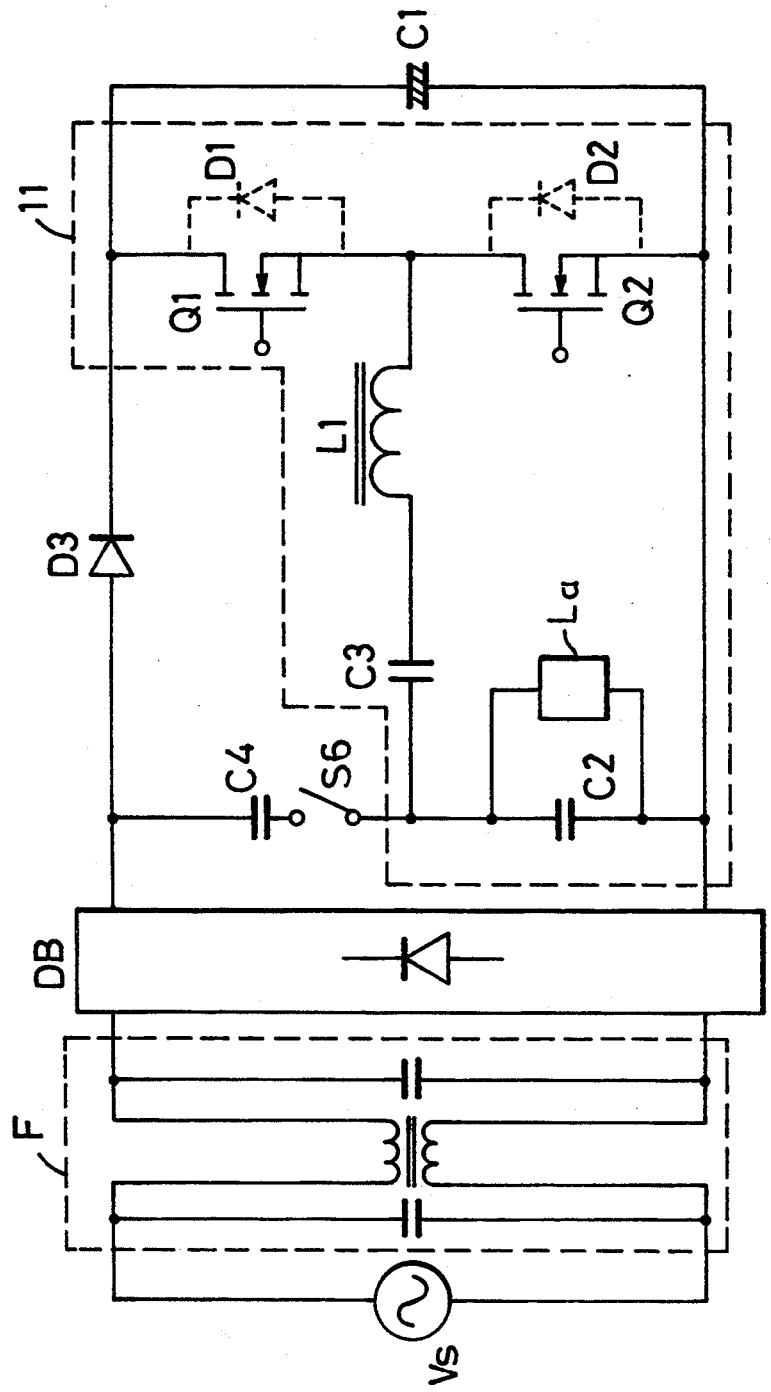
Figure 27:
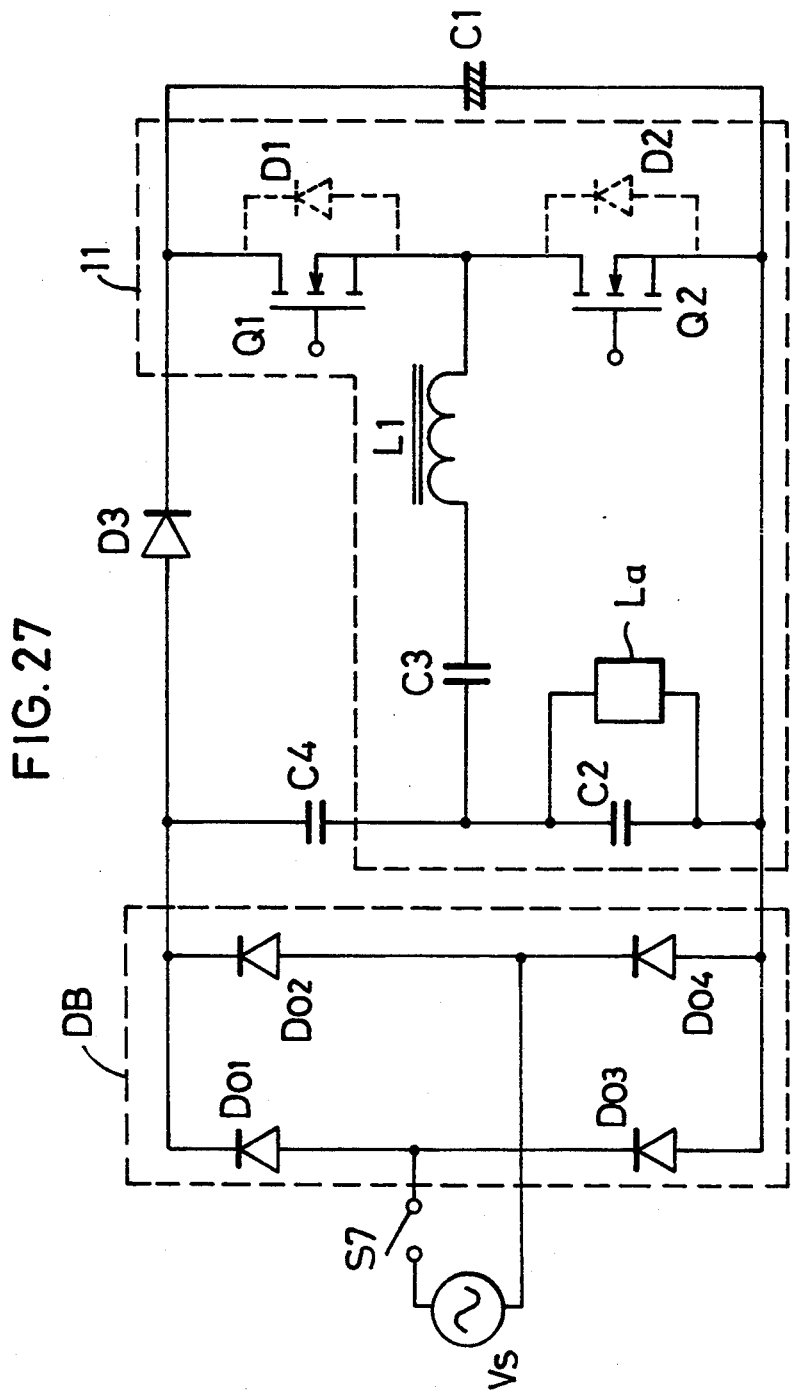

In FIG. 26, there is shown another embodiment of the present invention, in which a switch element S6 is inserted in series with the capacitor C4 for enabling the charge and discharge of the capacitor C4 to be commonly controllable. As shown further in FIG. 27, the same control can be attained even when a switch element S7 is inserted between the AC source Vs and the diode bridge DB in the circuit.

Figure 28:
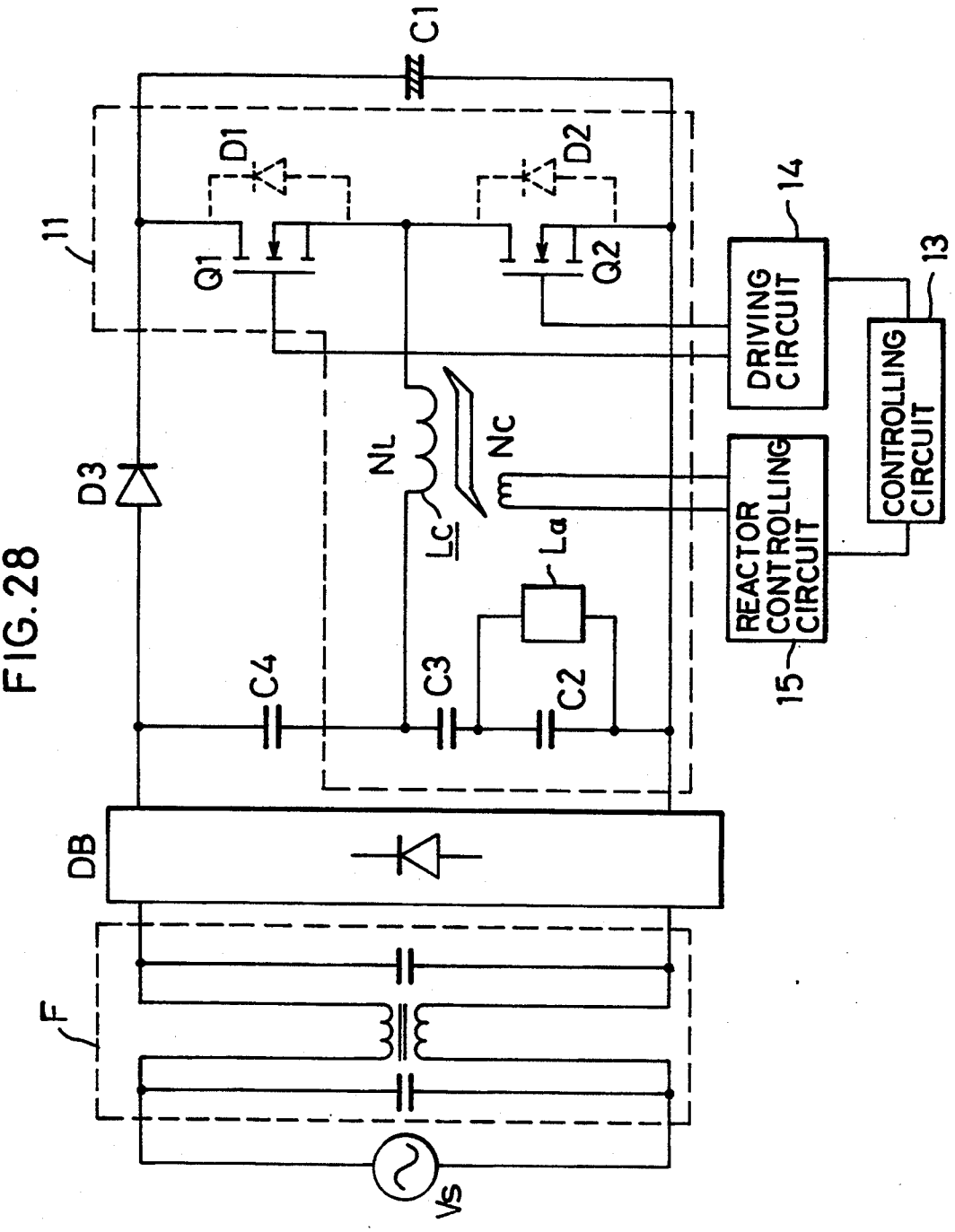
Figure 29:
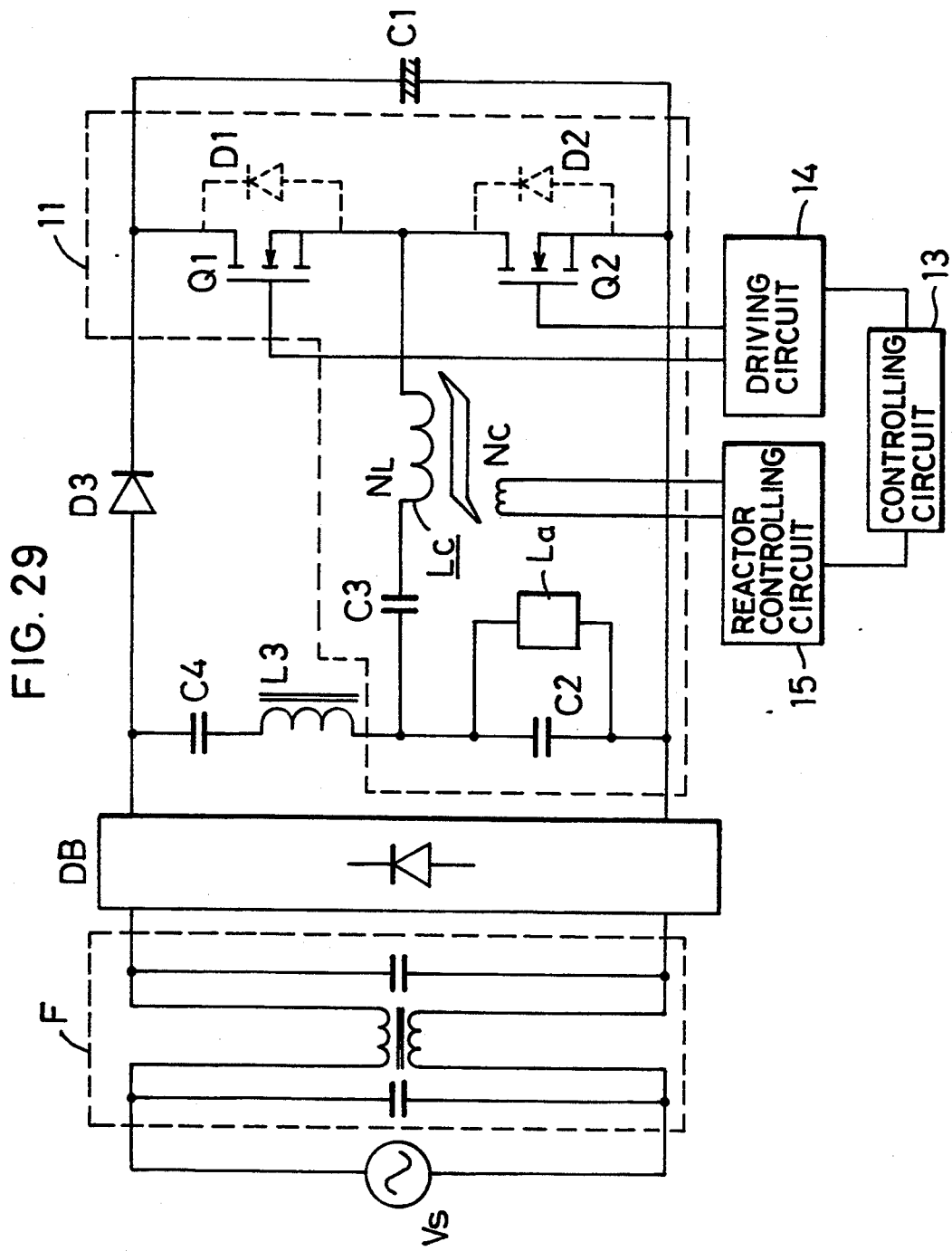

The featured circuit arrangement of the present invention is employable also in other circuits than those in the foregoing embodiments. In a further embodiments shown in FIG. 28, the arrangement is so made that the capacitor C3 is connected in series to the output end of the diode bridge DB together with the capacitors C2 and C4. As shown in another embodiment of FIG. 29, further, an arrangement in which an inductor L3 is provided between the capacitors C4 and C2. While in these embodiments of FIGS. 28 and 29, preferably, the arrangement for the ripple component reduction as employed in the embodiment of FIG. 16 can be employed, it is also possible to employ such arrangement for the ripple component reduction as referred to with reference to FIGS. 18–26. It is also possible to include further inductor or capacitor in the oscillatory systems of the inverter circuit 11.

Figure 30:
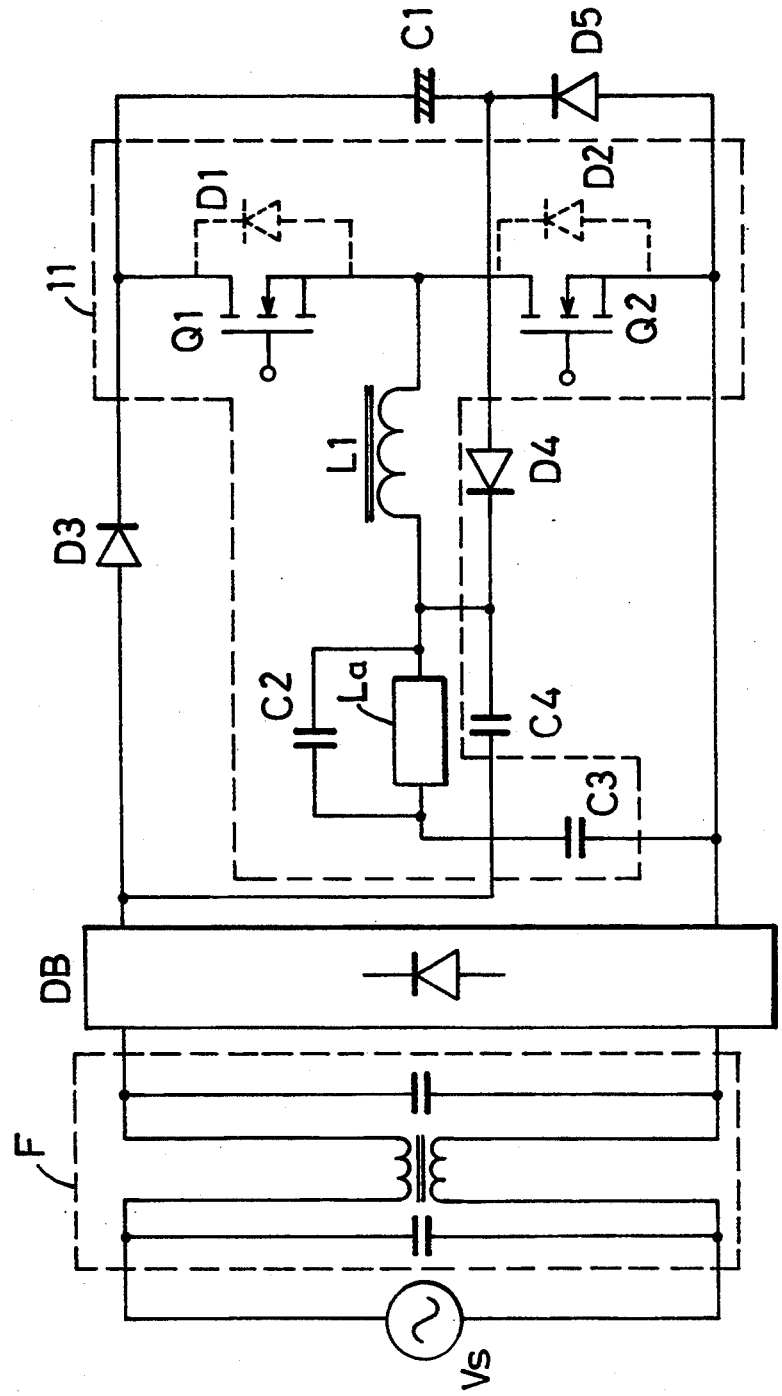

In FIG. 30, there is shown still another embodiment of the present invention, in which an additional measure is provided for preventing the rush current upon connection to the power source, while substantially the same arrangement as that of FIG. 1 is employed for all other parts. This embodiment is featured in the addition of the rush current preventing measure. Upon connection to the power source, the rush current is caused to flow, as the capacitor of a large capacity (preferably an electrolytic capacitor) is momentarily charged, which current being of a value from several ten times to hundred and several ten times as large as stational input current, and such problems as breaking of circuit breaker, fusion bonding of contacts in source switch and the like are apt to occur. In the present embodiment, therefore, a diode D5 is connected in series with the large capacity capacitor C1 in a direction of not causing the capacitor to be charged upon the source connection, and the rush current can be prevented by the diode D5 from flowing into the capacitor C1 upon the source connection. Further, in order that the capacitor C1 can be charged during ON time of the switching elements Q1 and Q2, a diode D4 is connected on cathode side between a connection point of the capacitor C1 to the diode D5 and a connection point of the load La to the inductor L1.

Here, the energy of the capacitor C1 flows, when the switching element Q2 is made ON, through a path of the diode bridge DB, diode D3, capacitor C1, diode D4, inductor L1 and switching element Q2. Upon turning OFF of the switching element Q2, too, energy accumulated in the inductor L1 causes a current to flow through a path of the inductor L1, diode D1, capacitor C1 and diode D4, and the charging of the capacitor C1 is carried out. That is, a voltage dropping chopper circuit is constituted by the capacitor C1, diode D4, inductor L1, switching element Q2 and diode D1, and the problem of the rush current can be effectively eliminated by carrying out a control for gradually enlarging the ON-duty of the switching element Q2 upon the source connection.

Figure 31:
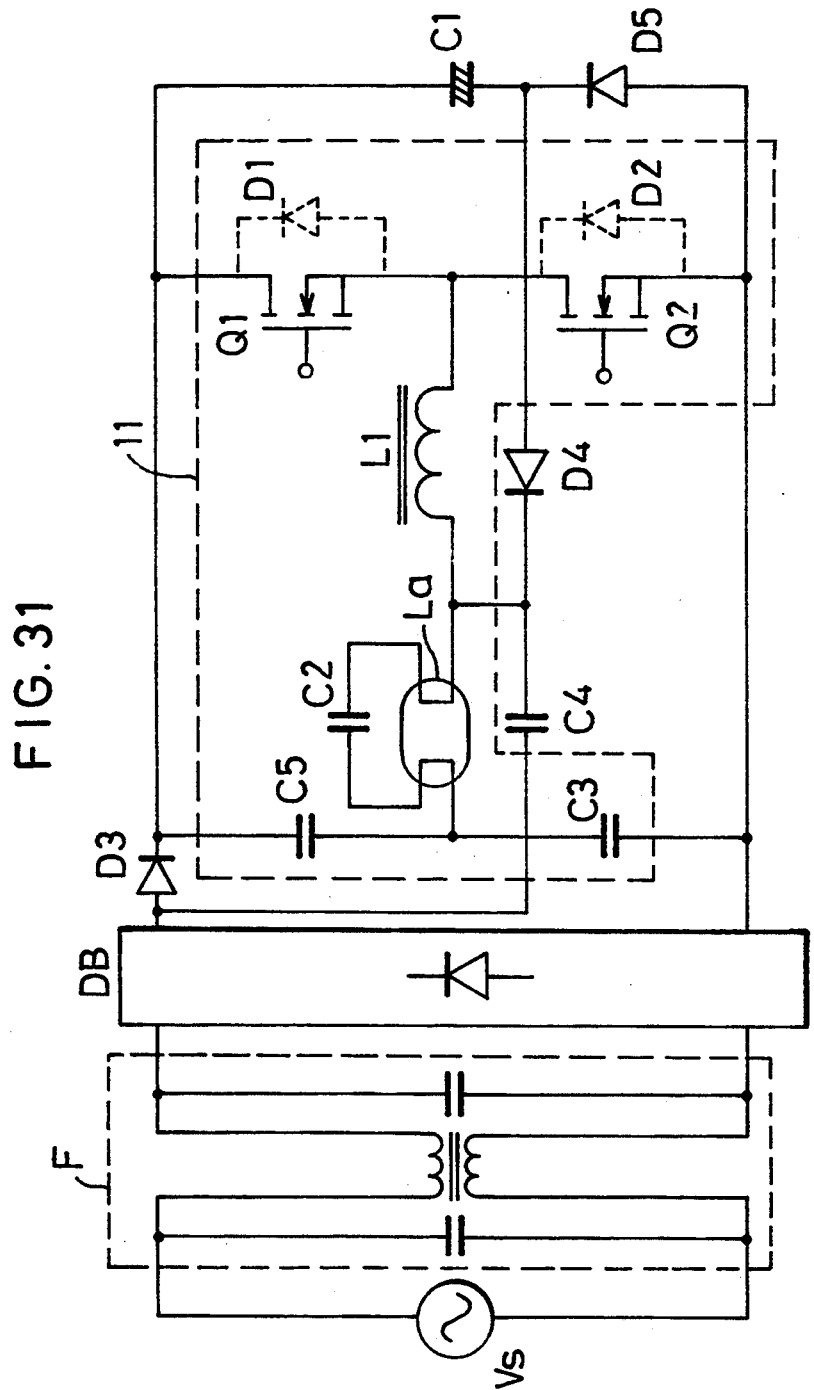

In still another embodiment of the present invention as shown in FIG. 31, the same is different from the embodiment of FIG. 30 in respect that a capacitor C5 is connected between a connecting point of the diode D3 to the capacitor C1 and a connecting point of the discharge lamp as the load La to the capacitor C3, while other arrangement is the same as FIG. 30. The capacitor C5 functions as one for cutting the DC component similarly to the capacitor C3. Here, in the case of the foregoing half-bridge type inverter circuit, the operation substantially does not change even in the absence of one of such capacitors C3 and C5 as shown in FIG. 31. When on the other hand the measure is taken for preventing the rush current by inserting the diodes D3 and D5, one of regenerative current loops of the inverter circuit to be included in the discharge lamp lighting device according to the present invention is lost. That is, in the case of the embodiment of FIG. 30, there should be a feedback through the diode D1 to the capacitor C1 of an oscillation current in the oscillatory system constituted by the inductor L1 and capacitor C2 upon turning OFF of the switching element Q2, but the regenerative current does not flow due to the presence of the diode D5. Accordingly, a current is caused to flow by the energy accumulated in the inductor L1 through a path of the inductor L1, diode D1, capacitor C1 and diode D4, and no oscillation action of the inductor L1 and capacitor C2 occurs, whereby the oscillation action of the entire inverter circuit is weakened, to lower the voltage generated across the discharge lamp La, so as not to be able to apply any sufficiently large starting voltage to the discharge lamp La upon, in particular, starting the lamp, and there arises a problem that the discharge lamp La cannot be performed in smooth manner.

In the present embodiment, the provision of the capacitor C5 is effective, upon turning OFF of the switching element Q2, to form a path of the regenerative current flowing through the inductor L1, diode D1, capacitor C5, discharge lamp La and capacitor C2, so that the weakening of the oscillation of the inverter circuit can be prevented. With this arrangement, it is made possible to apply a sufficient starting voltage to the discharge lamp La.

Figure 32:
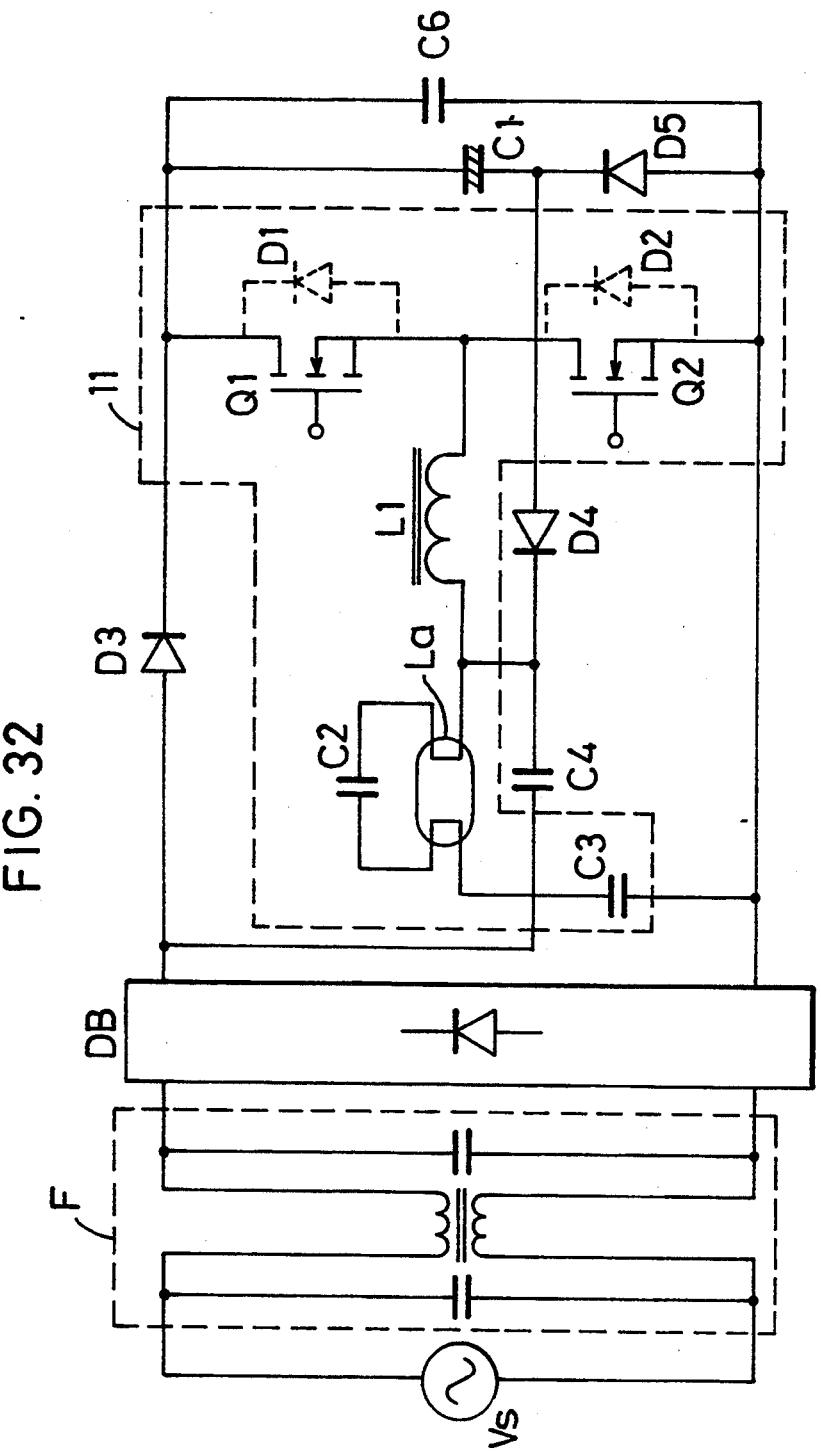
Figure 33:
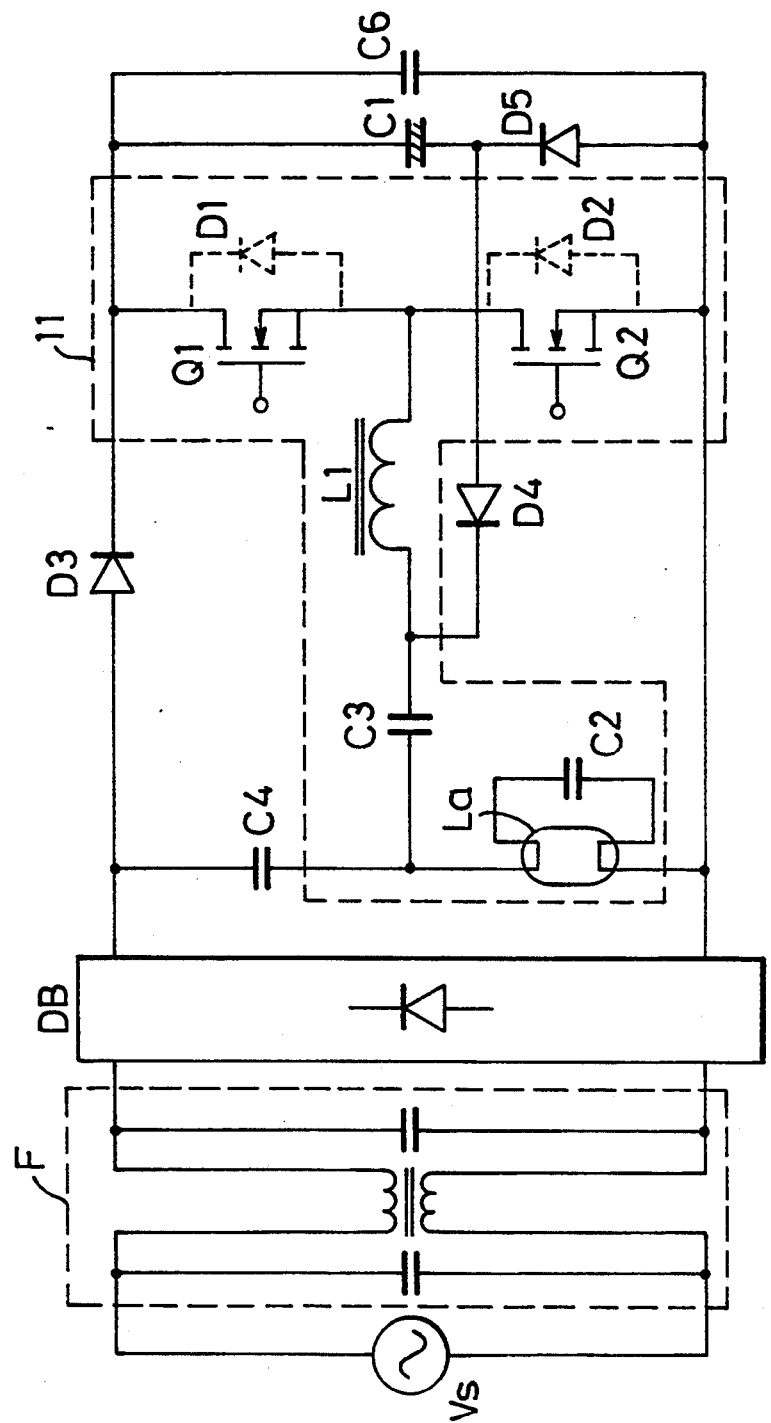
Figure 34:
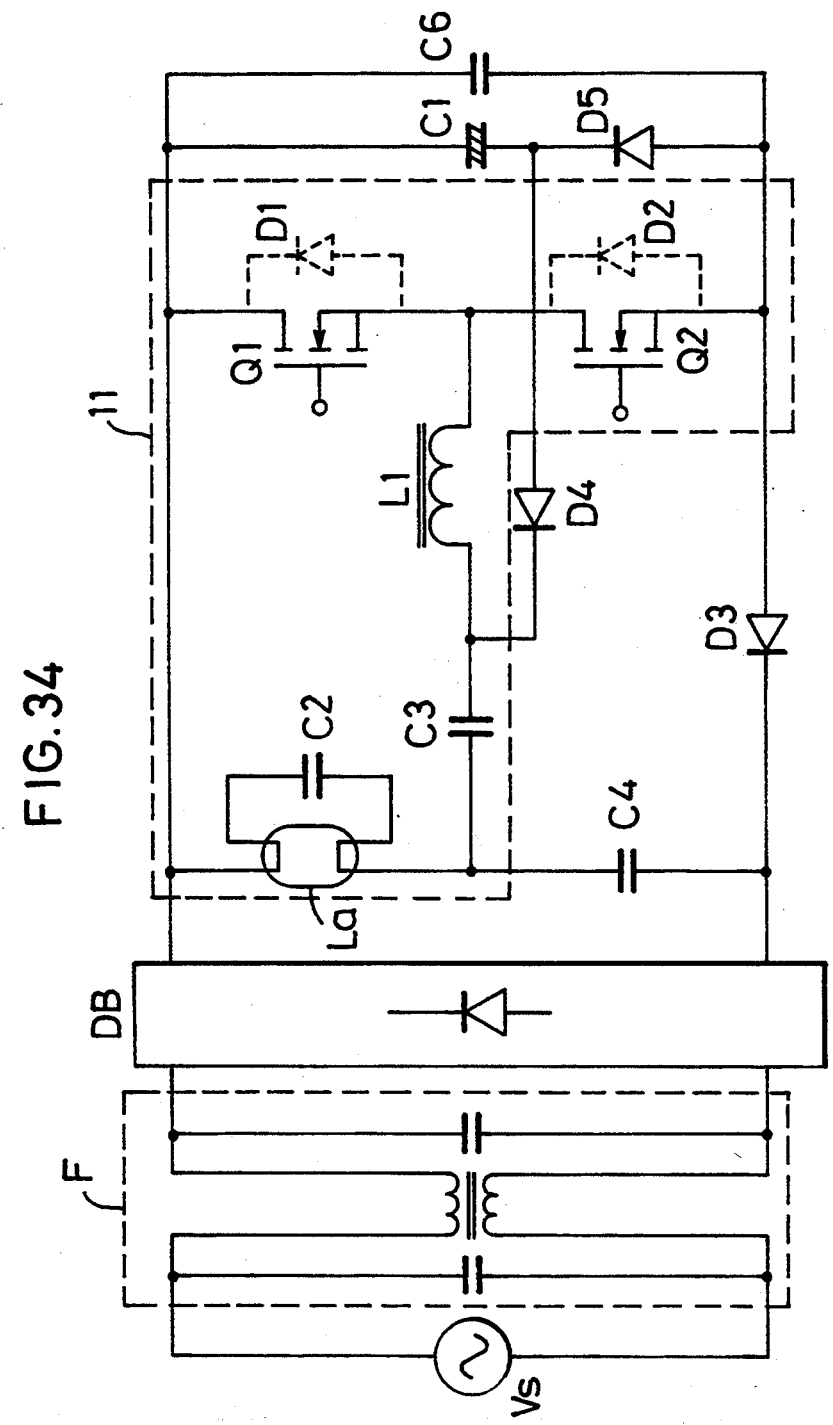
Figure 35:
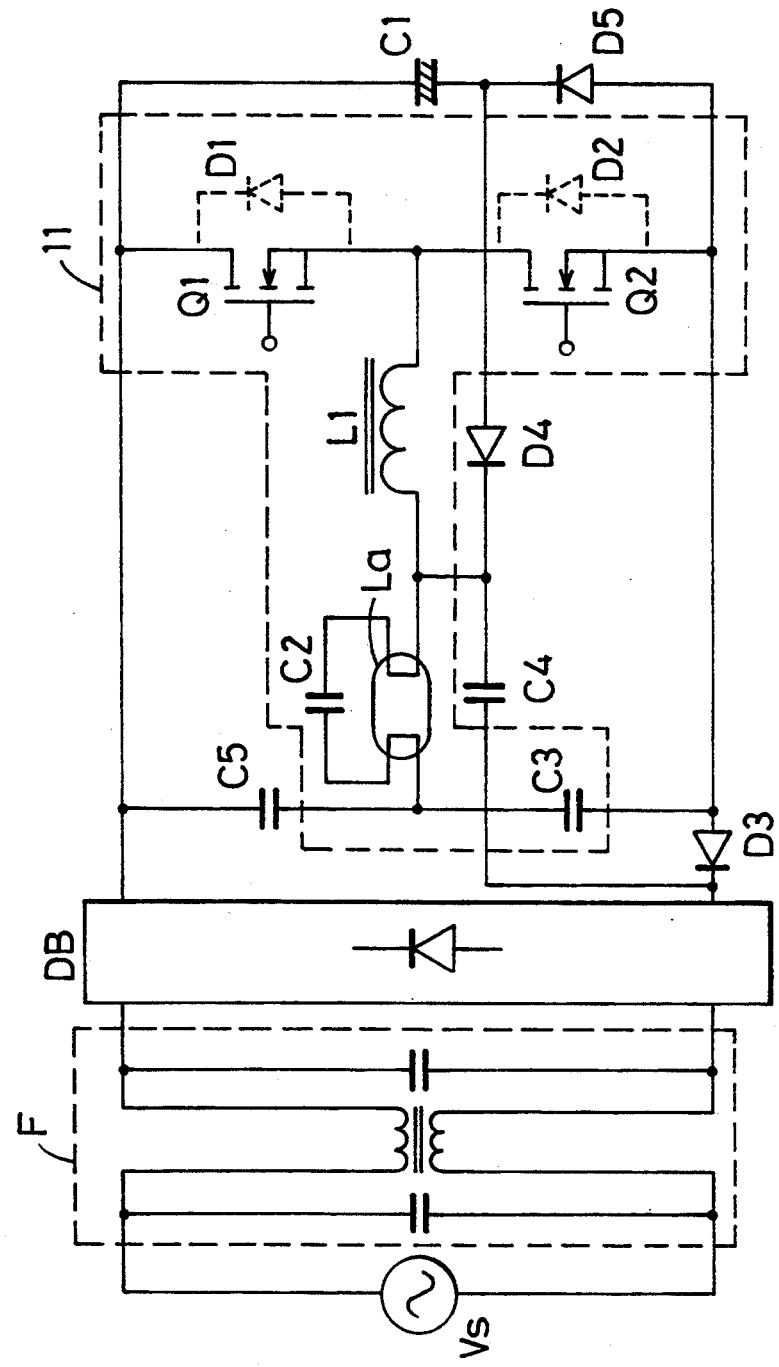
Figure 36:
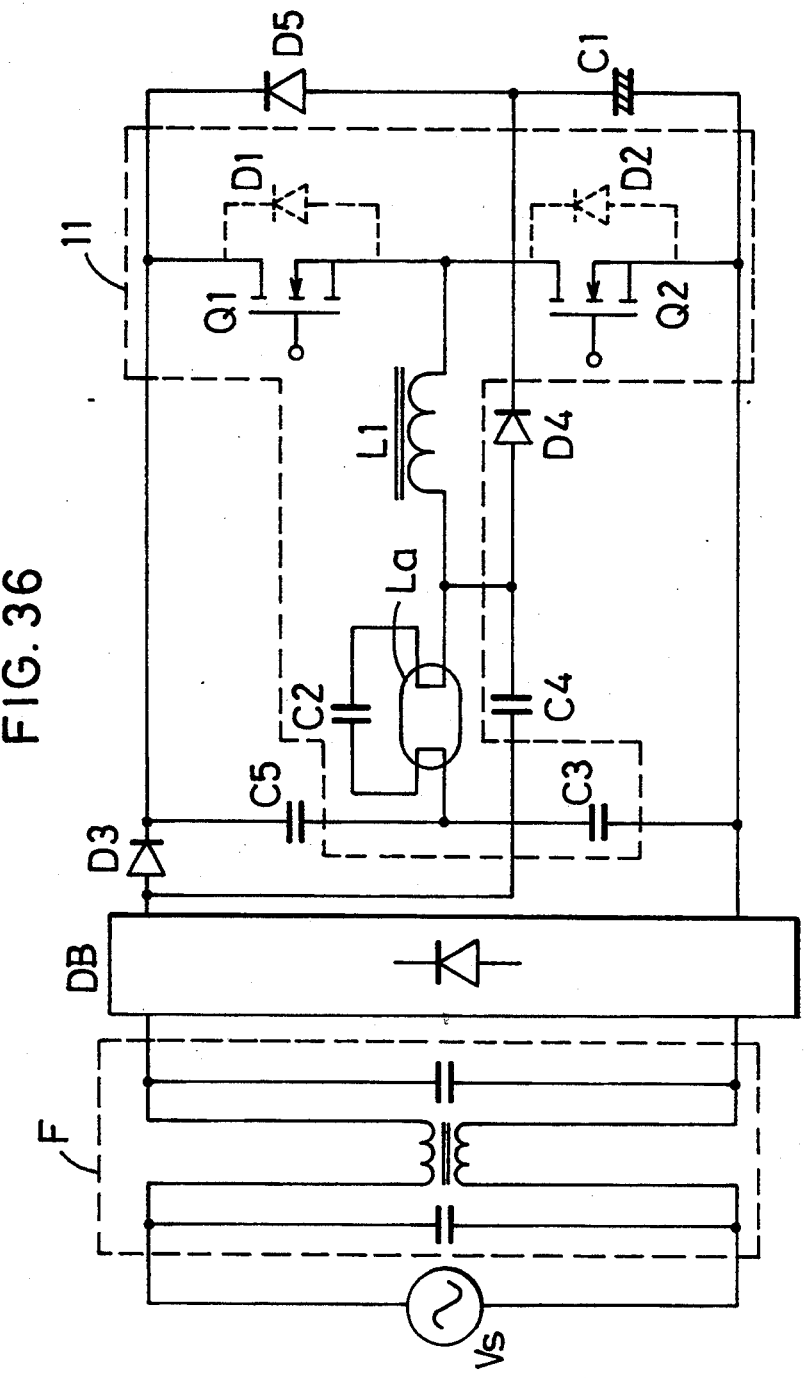

In another embodiment shown in FIG. 32, a capacitor C6 is connected to both ends of the series circuit of the capacitor C1 and diode D1, in which event the regenerative current is caused to flow, upon OFF of the switching element Q2, through a path of the inductor L1, diode D1, capacitor C6, capacitor C3, discharge lamp La and capacitor C2. In further embodiments of FIGS. 33 to 36, there is taken the measure for preventing the rush current, while the substantial arrangement is the same as that in the foregoing embodiments. While in the embodiments of FIGS. 30 to 36, no control circuit is shown, it should be appreciated that such control circuit for the ripple component reduction as has been referred to with reference to FIG. 10 and the like can be properly provided.

What is claimed is:

1. A high power-factor inverter device comprising:
a rectifier having first and second output terminals for rectifying an AC source voltage;
a first diode connected to said first output terminal of said rectifier;
a smoothing capacitor connected across the output terminals of said rectifier and to said first output terminal through said first diode;
an inverter circuit connected across said smoothing capacitor for supplying a high frequency output voltage to a load, said inverter circuit including a closed circuit comprising a first series circuit connected across said smoothing capacitor, said first series circuit including first and second switching elements, a second series circuit including a resonance capacitor, a resonance inductor and a DC blocking capacitor connected between said resonance inductor and said resonance capacitor, said second series circuit being connected across at least one of said first and second switching elements, and an input power-factor improving capacitor connected between a junction of said rectifier and said first diode and a junction in said series circuit;
said load connected in parallel with said resonance capacitor; and
means for controlling ON and OFF operation of said first and second switching elements for reducing current ripple in the high frequency output voltage supplied to said load.

2. The high power-factor inverter device according to claim 1 wherein said DC blocking capacitor is connected between said resonance capacitor and said resonance inductor, and said input power-factor improving capacitor is connected between a junction of said rectifier and said first diode and a junction of said resonance capacitor and said DC blocking capacitor.

3. The high power-factor inverter device according to claim 1 including a second diode connected to said second output terminal of said rectifier and to said smoothing capacitor in reverse polarity to said first diode, said inverter circuit being connected in parallel with said smoothing capacitor and said second diode connected in series for providing a high frequency voltage output, and a third diode having a cathode connected to said resonance inductor and an anode connected to a junction of said smoothing capacitor and said second diode.

4. The high power-factor inverter device according to claim 3 comprising an additional capacitor connected across the series circuit of said smoothing capacitor and said second diode.

5. The high power-factor inverter device according to claim 1 including a second diode connected between said first output terminal of said rectifier and said smoothing capacitor, said smoothing capacitor being directly connected to said second output terminal of said rectifier said first diode being connected between said first output terminal of said rectifier and said series circuit of said second diode and said smoothing capacitor and a third diode having a cathode connected to said smoothing capacitor at a junction of said second diode and said smoothing capacitor and having an anode connected to said resonance inductor at a junction of said resonance indicator and said input power-factor improving capacitor.

6. The high power-factor inverter device according to claim 1 wherein said controlling means comprises means for providing a first output supplied to said load without said input power-factor improving capacitor and a second output supplied to said load with said input power-factor improving capacitor that are nearly equal, and wherein an oscillation frequency of said inverter circuit varies in accordance with variation in the AC source voltage.

7. The high power-factor inverter device according to claim 1 wherein said inverter circuit includes an additional capacitor connected in series with said resonance capacitor.

8. The high power-factor inverter device according to claim 1 wherein said means for controlling includes means for varying an oscillation frequency of said inverter circuit to reduce current ripple in the high frequency output voltage supplied to said load by regulating said resonance inductor, and wherein said means for varying comprises a switch element and a plurality of inductors selectively connectable through said switch element, a composite inductance of said plurality of inductors being varied by turning said switch element ON and OFF.

9. The high power-factor inverter device according to claim 1 wherein said means for controlling includes means for varying an oscillation frequency of said inverter circuit in a direction to reduce current ripple in the high frequency output voltage supplied to said load comprises a saturable reactor having control windings and output windings, inductance of said output windings being variable in response to said control winding.

10. The high power-factor inverter device according to claim 1 wherein said means for controlling includes means for varying an oscillation frequency of said inverter circuit in a direction to reduce current ripple in the high frequency output voltage supplied to said load by regulating charging and discharging of said input power-factor improving capacitor.

* * * * *